United States Patent
Pham

(10) Patent No.: US 9,619,729 B2
(45) Date of Patent: Apr. 11, 2017

(54) DENSITY MEASURING DEVICE, DENSITY MEASURING METHOD, AND COMPUTER PROGRAM PRODUCT

(71) Applicant: KABUSHIKI KAISHA TOSHIBA, Tokyo (JP)

(72) Inventor: Quoc Viet Pham, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/938,466

(22) Filed: Nov. 11, 2015

(65) Prior Publication Data

US 2016/0140414 A1    May 19, 2016

(30) Foreign Application Priority Data

Nov. 13, 2014 (JP) .................................. 2014-230886

(51) Int. Cl.
*G06K 9/00* (2006.01)
*G06K 9/46* (2006.01)
*G06K 9/62* (2006.01)

(52) U.S. Cl.
CPC ....... *G06K 9/4642* (2013.01); *G06K 9/00771* (2013.01); *G06K 9/469* (2013.01); *G06K 9/6219* (2013.01); *G06K 9/6282* (2013.01)

(58) Field of Classification Search
CPC ......... G06K 15/027; G06K 2009/4666; G06K 9/00288; G06K 9/6211; G06K 9/6292; H04N 1/4072
See application file for complete search history.

(56) References Cited

U.S. PATENT DOCUMENTS

| 2007/0047805 A1* | 3/2007 | Ohtsu ................ G06K 9/00456 382/164 |
| 2012/0039539 A1* | 2/2012 | Boiman ................. G11B 27/28 382/195 |
| 2015/0242709 A1 | 8/2015 | Pham | |

FOREIGN PATENT DOCUMENTS

| JP | 2014-6586 | 1/2014 |
| JP | 2015-158712 | 9/2015 |

* cited by examiner

*Primary Examiner* — Eueng-Nan Yeh
(74) *Attorney, Agent, or Firm* — Finnegan, Henderson, Farabow, Garrett & Dunner LLP

(57) ABSTRACT

According to an embodiment, a density measuring device includes a first calculator, a second calculator, and a first generator. The first calculator calculates, from an image including objects of a plurality of classes classified according to a predetermined rule, for each of a plurality of regions formed by dividing the image, density of the objects captured in the region. The second calculator calculates, from the density of the objects captured in each of the regions, likelihood of each object class captured in each of the regions. The first generator generates density data, in which position corresponding to each of the regions in the image is assigned with the density of the object class having at least the higher likelihood than the lowest likelihood from among likelihoods calculated for object classes captured in the corresponding region.

19 Claims, 20 Drawing Sheets

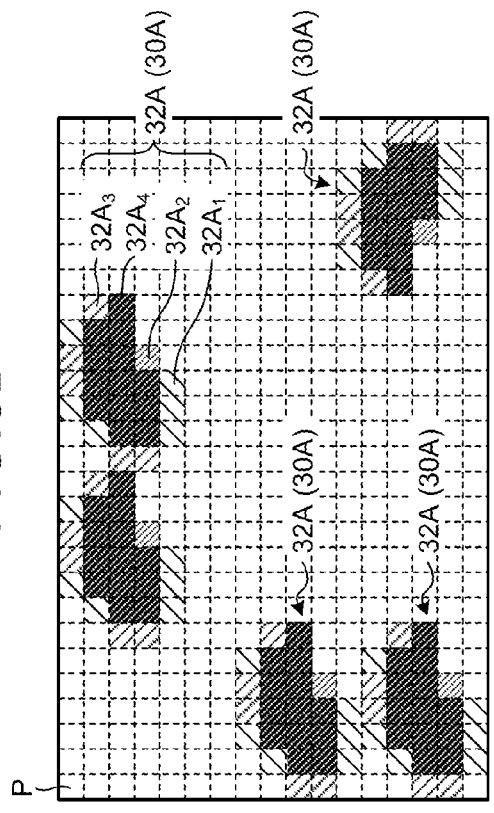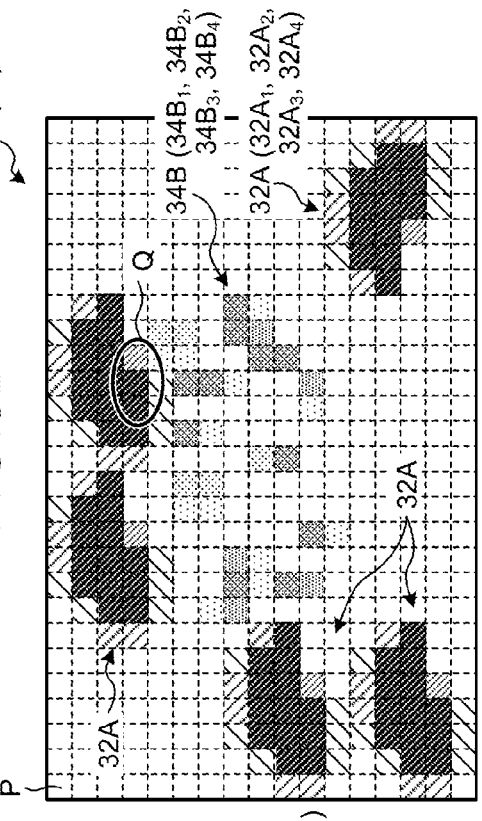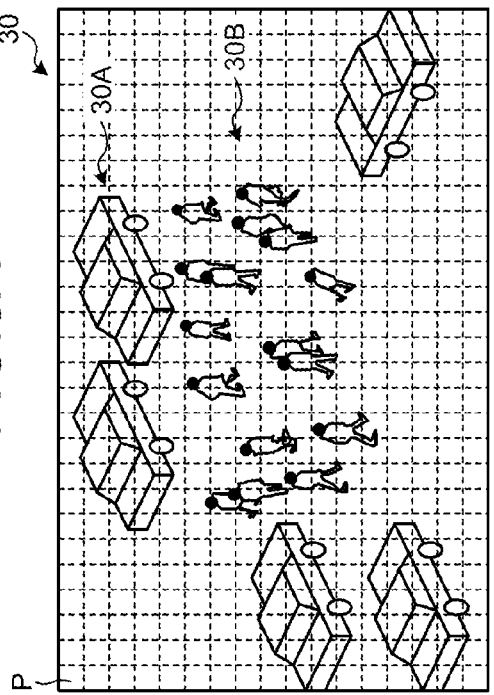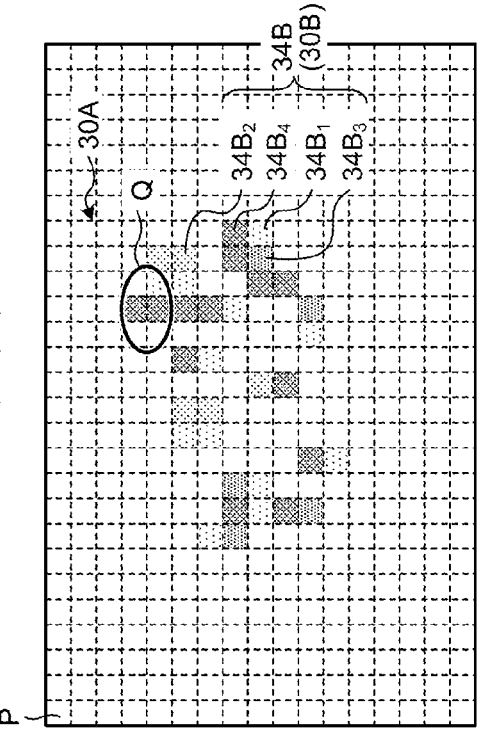

FIG.4
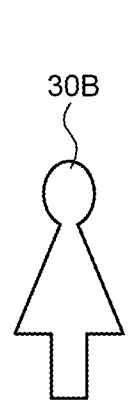
AREA S
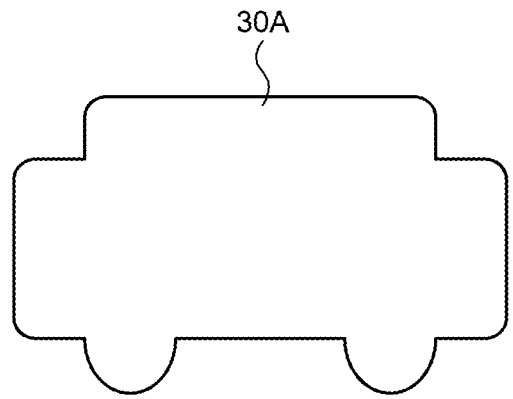
AREA KS

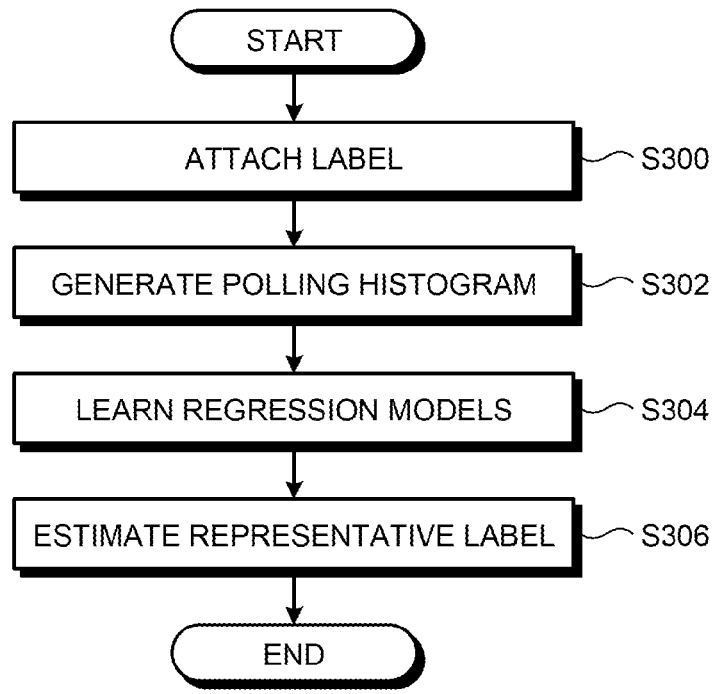
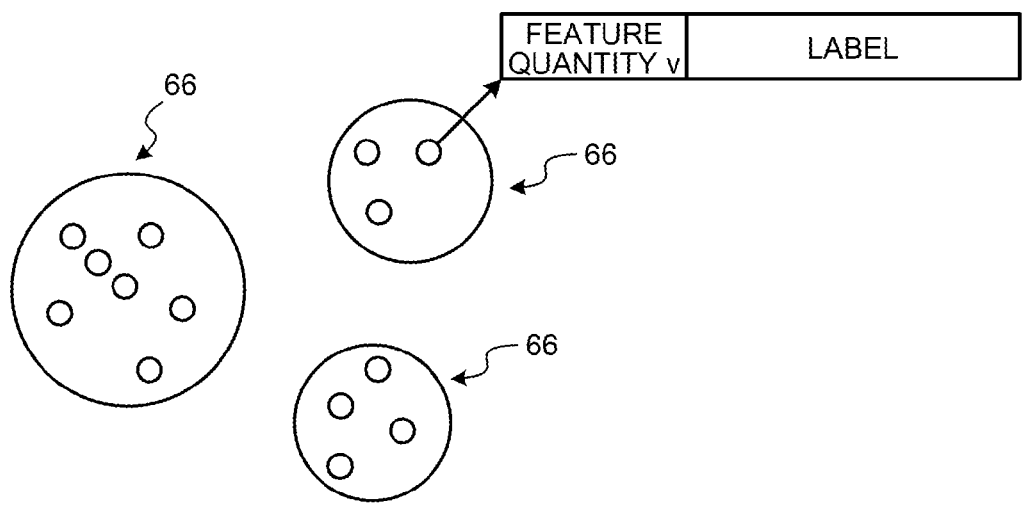

DENSITY MEASURING DEVICE, DENSITY MEASURING METHOD, AND COMPUTER PROGRAM PRODUCT

CROSS-REFERENCE TO RELATED APPLICATIONS

This application is based upon and claims the benefit of priority from Japanese Patent Application No. 2014-230886, filed on Nov. 13, 2014; the entire contents of which are incorporated herein by reference.

FIELD

Embodiments described herein relate generally to a density measuring device, a density measuring method, and a computer program product.

BACKGROUND

A device is known that measures the densities of objects captured in an image. For example, JP-A 2014-6586 (KOKAI) discloses that the number of specific objects is measured based on the area ratio of the foreground region with respect to the captured image.

However, if a plurality of types (classes) of objects is captured in an image, then it difficult to accurately calculate the density of each object class captured in the image due to false recognition of the object class.

BRIEF DESCRIPTION OF THE DRAWINGS

FIGS. 3A to 3D are schematic diagrams illustrating the processing performed with respect to the image;

FIG. 4 is an explanatory diagram for explaining likelihood calculation;

FIG. 20 is a flowchart for explaining a sequence of operations performed during the arithmetic processing;

FIG. 21 is an explanatory diagram for explaining the learning using a nearest neighbor classifier.

DETAILED DESCRIPTION

According to an embodiment, a density measuring device includes a first calculator, a second calculator, and a first generator. The first calculator calculates, from an image including objects of a plurality of classes classified according to a predetermined rule, for each of a plurality of regions formed by dividing the image, density of the objects captured in the region. The second calculator calculates, from the density of the objects captured in each of the regions, likelihood of each object class captured in each of the regions. The first generator generates density data, in which position corresponding to each of the regions in the image is assigned with the density of the object class having at least the higher likelihood than the lowest likelihood from among likelihoods calculated for object classes captured in the corresponding region.

Various embodiments are described below in detail with reference to the accompanying drawings.

First Embodiment

Figure 1:
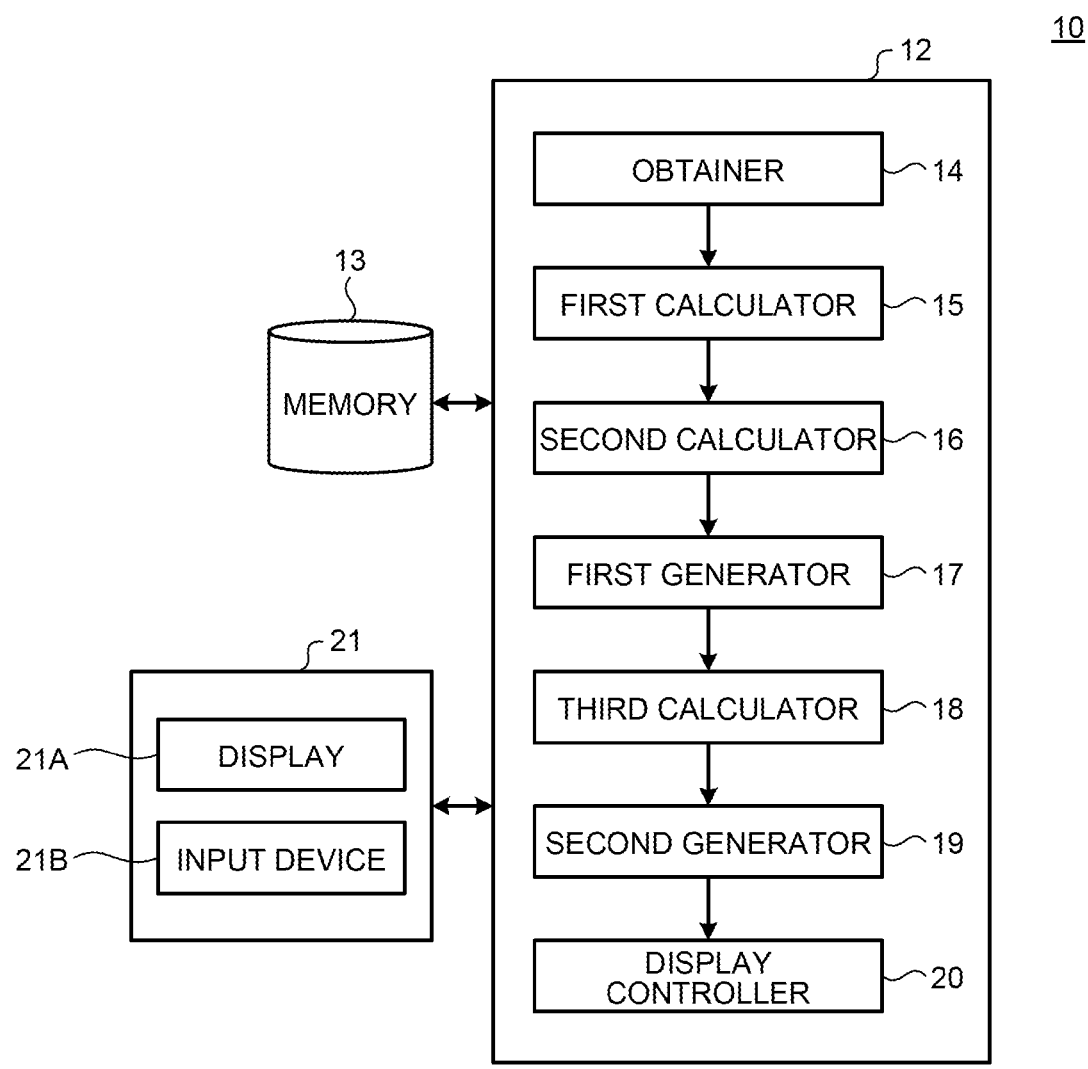
FIG. 1 is a block diagram illustrating a functional configuration of a density measuring device according to an embodiment.

FIG. 1 is a block diagram illustrating a functional configuration of a density measuring device 10 according to a first embodiment. The density measuring device 10 includes a controller 12, a memory 13, and a user interface (UI) 21. The memory 13 and the UI 21 are electrically connected to the controller 12.

The UI 21 includes a display 21A and an input device 21B. The display 21A is used to display various images. Examples of the display 21A include a cathode-ray tube (CRT) display, a liquid crystal display, an organic electroluminescence (EL) display, and a plasma display. The input device 21B receives various instructions and information input from the user. Examples of the input device 21B include a keyboard, a mouse, a switch, and a microphone.

Meanwhile, the UI 21 can also be configured to function as a touch-sensitive panel in which the display 21A and the input device 21B are integrated.

The memory 13 stores therein a variety of data. In the first embodiment, the memory 13 stores therein a target image for density measurement in the density measuring device 10. The memory 13 can be implemented using a memory device such as a hard disk drive (HDD), a solid state drive (SSD), a read only memory (ROM), or a memory card in which information can be stored in a magnetic, optical, or electrical manner.

The target image for density measurement in the density measuring device 10 includes a plurality of object classes. Herein, the class (or object class) implies the classification done according to a predetermined rule. The objects of a particular class are objects classified into that classification (i.e., that class).

The predetermined rule represents one or more features used in distinguishing the objects from each other by analyzing the captured image in which the objects are captured. Examples of the predetermined rule include colors, shapes, and movements. Hence, for example, the object classes at least each have different colors or have different shapes.

In the first embodiment, the explanation is given for an example in which persons and vehicles represent objects. That is, in the first embodiment, the explanation is given for an example in which the objects captured in the target image for density measurement are of the object classes of "persons" and "vehicles". However, the objects and object classes are not limited to persons and vehicles.

The controller 12 is a computer that includes a central processing unit (CPU), a read only memory (ROM), and a random access memory (RAM). However, alternatively, the controller 12 can have a circuit other than a CPU.

The controller 12 controls the entire density measuring device 10. Moreover, the controller 12 includes an obtainer 14, a first calculator 15, a second calculator 16, a first generator 17, a third calculator 18, a second generator 19, and a display controller 20.

Herein, some or all of the obtainer 14, the first calculator 15, the second calculator 16, the first generator 17, the third calculator 18, the second generator 19, and the display controller 20 can be implemented by making a processor such as a CPU execute computer programs, that is, can be implemented using software; or can be implemented using hardware such as an integrated circuit (IC); or can be implemented using a combination of software and hardware.

Meanwhile, as long as the controller 12 includes the first calculator 15, the second calculator 16, and the first generator 17; it serves the purpose. That is, the controller 12 may not include at least one of the obtainer 14, the third calculator 18, the second generator 19, and the display controller 20.

The obtainer 14 obtains target images for density measurement in the density measuring device 10. In the first embodiment, the obtainer 14 obtains the images from the memory 13. Alternatively, the obtainer 14 can obtain the images from an external device (not illustrated) or a known photographing device (not illustrated).

Figure 2A:
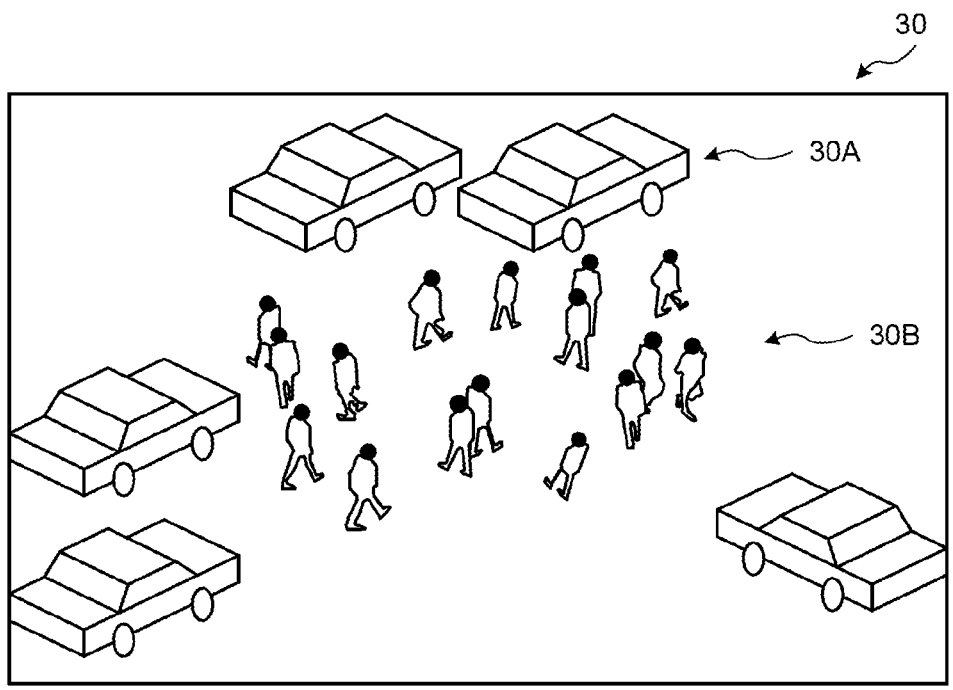
FIG. 2A is a diagram illustrating an example of a target image for density measurement.

FIG. 2A is a diagram illustrating an exemplary image 30 that is the target image for density measurement in the density measuring device 10. As described above, in the first embodiment, the explanation is given for a case in which the image 30 includes vehicles 30A and persons 30B as the objects classes.

From an image obtained by the obtainer 14, the first calculator 15 calculates the density of each the object class captured in each of a plurality of regions formed by dividing the image.

Figure 2B:
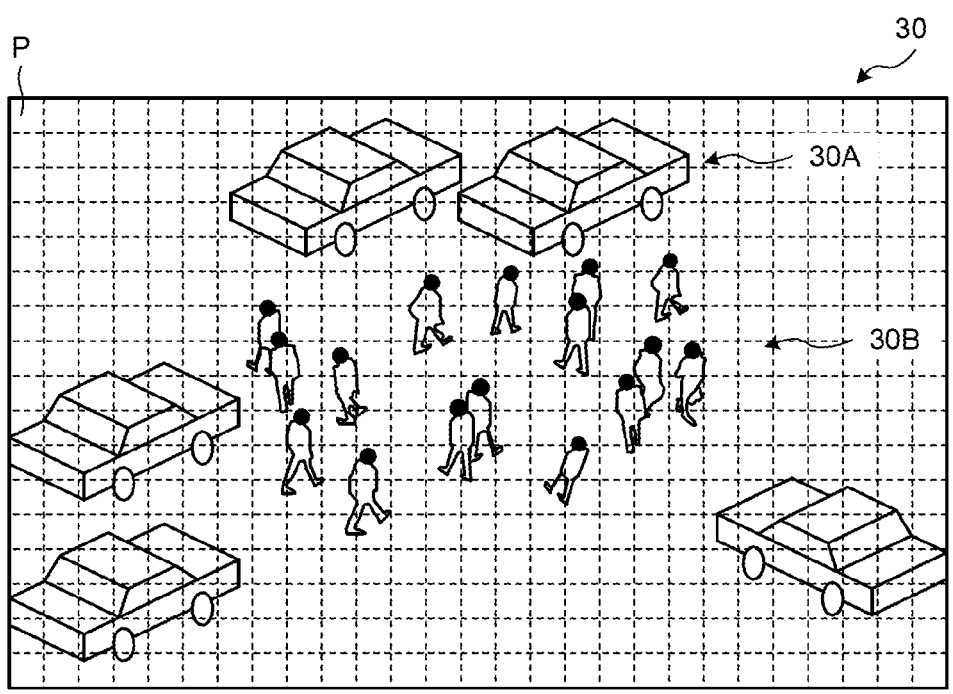
FIG. 2B is a schematic diagram illustrating a state in which the image 30 is divided into a plurality of regions.

FIG. 2B is a schematic diagram illustrating a state in which the image 30 is divided into a plurality of regions P. The first calculator 15 divides the image 30 into a plurality of regions P. The number of divisions in the image 30 and the size of the regions P can be set to arbitrary values. For example, the regions P can be pixel regions either including a plurality of pixels or including only a single pixel. Moreover, closer the width of the region P to the width equivalent to a single pixel, the higher is the accuracy with which the density measuring device 10 can calculate the density. For that reason, it is desirable that the regions P are equivalent to single pixels. However, as described above, the regions P can also include a plurality of pixels.

The first calculator 15 calculates, for each region P in the image 30, the density of each object class captured in the region P. According to the first embodiment, in the image 30, the vehicles 30A and the persons 30B are captured as the object classes. Hence, in the first embodiment, the first calculator 15 calculates, for each region P, the density of the vehicles 30A captured therein and the density of the persons 30B captured therein.

Regarding the calculation of the density of each object class captured in each region P, the first calculator 15 can implement any known method. However, in the aspect of enhancing the accuracy of density calculation, it is desirable that the first calculator 15 implements the calculation method described in a second embodiment (details given later) in order to calculate the density of each object class captured in each region P.

FIGS. 3A to 3D are schematic diagrams illustrating the processing performed with respect to the image 30. For example, assume that the first calculator 15 calculates the density of each object class captured in each region P in the image 30 illustrated in FIG. 3A (identical to FIG. 2B).

Thus, the first calculator 15 calculates, for each region P, the density of the vehicles 30A captured therein and the density of the persons 30B captured therein.

FIG. 3B is a diagram that schematically illustrates a density 32A of the vehicles 30A which is calculated for each region P in the image 30. In the example illustrated in FIG. 3B, the densities 32A of the vehicles 30A captured in the regions P go on increasing from a density $32A_1$ toward a density $32A_4$. As illustrated in FIG. 3B, the first calculator 15 calculates, for each region P, the density 32A (one of the densities $32A_1$ to $32A_4$) of the vehicles 30A captured therein. Meanwhile, the densities calculated by the first calculator 15 are not limited to the four levels mentioned above.

FIG. 3C is a diagram that schematically illustrates a density 34B of the persons 30B which is calculated for each region P in the image 30. In the example illustrated in FIG. 3C, the densities 34B of the persons 30B captured in the regions P go on increasing from a density $34B_1$ toward a density $34B_4$. As illustrated in FIG. 3C, the first calculator 15 calculates, for each region P, the density 34B (one of the densities $34B_1$ to $34B_4$) of the persons 30B captured therein.

Returning to the explanation with reference to FIG. 1, from the density of each object class captured in each region P as calculated by the first calculator 15, the second calculator 16 calculates the likelihoods of the types of objects captured in each region P. In the first embodiment, the likelihood represents the probability of the object class. In the first embodiment, the second calculator 16 calculates the likelihoods, which represent the probabilities, of the object classes captured in each region P from the calculated densities of those object classes.

More specifically, as the likelihoods of the object classes captured in each region P, the second calculator 16 calculates multiplication values obtained by multiplying the calculated density of each object class captured in the region P, by at least either the area ratio or the degree of similarity.

For example, assume that the vehicles 30A and the persons 30B are the object classes captured in the image 30. In that case, for each region P in the image 30, the second calculator 16 calculates the likelihood representing the probability of the vehicles 30A and the likelihood representing the probability of the persons 30B.

The area ratio represents the ratio of the area of the objects of each of a plurality of types, which are captured in the image 30, with respect to a reference object. Herein, the reference object can be an object having a predetermined size or can be an object of the type having the smallest area from among the objects of a plurality of types captured in the image 30.

FIG. 4 is an explanatory diagram for explaining the likelihood calculation. For example, assume that the person 30B and the vehicle 30A have "area S":"area KS" as the general relationship of the area ratio. Moreover, assume that the person 30B serves as the reference object.

In the first embodiment, the "area" represents the mean area of the objects of each type in a two-dimensional image. Thus, the area (the mean area) of the persons 30B represents, for example, the area of the regions including the persons 30B in a captured image in which the entire body of a person 30B having standard proportions is captured from the front side of that person 30B. Alternatively, the area of the persons 30B can be the average value of the areas of the persons 30B having different proportions. The area (the mean area) of the vehicles 30A represents the area of the regions of the vehicles 30A in a captured image in which a vehicle 30A having the standard size is captured laterally (and which has the same photographing scale factor as the captured image of the person 30B).

In the case of calculating the likelihood using the area, the second calculator 16 calculates the likelihood of the persons 30B and the likelihood of the vehicles 30A in each region P using Equations (1) and (2) given below.

$$LB(P)=DB(P) \times S/S \qquad (1)$$

$$LA(P)=DA(P) \times KS/S \qquad (2)$$

In Equation (1), LB(P) represents the likelihood of the persons 30B in the region P, and DB(P) represents the density of the persons 30B in the region P. In Equation (2), LA(P) represents the likelihood of the vehicles 30A in the region P, and DA(P) represents the density of the vehicles 30A in the region P. Moreover, in Equations (1) and (2), S represents the general area of the persons 30B (treated herein as the reference area), and KS represents the general area of the vehicles 30A. Thus, S/S represents the area ratio of the persons 30B with respect to the area of the reference object (herein, as an example, the mean area of the persons 30B). Moreover, KS/S represents the area ratio of the vehicles 30A with respect to the area of the reference object (herein, the area of the persons 30B).

Meanwhile, the second calculator 16 can store therein in advance the value indicating the general area ratio of the persons 30B and the vehicles 30A (i.e., "area S":"area KS"). Then, during the likelihood calculation, the stored area ratio can be used.

Moreover, the second calculator 16 stores, in advance in the memory 13, the mean area of the objects of each of a plurality of types likely to be captured in the image 30. Then, the second calculator 16 reads the mean area corresponding to the types captured in the image 30, and can use the mean area during likelihood calculation.

The degree of similarity mentioned above implies the degree of similarity in features with respect to the standard features of the objects of each type (hereinafter, referred to as reference features). Greater the similarity between features, the greater (higher) is the value of the degree of similarity. A feature is, for example, a value representing the characteristic elements of the objects of the type. Examples of the features include colors and shapes. As the colors used as the feature, it is possible to use a color histogram.

For example, the memory 13 stores therein in advance the value representing the feature of the objects of each type. For example, if a particular object has a characteristic color, then the memory 13 stores therein in advance the characteristic color of that object class as the reference feature of that object. Similarly, if a particular object has a characteristic shape, then the memory 13 is used to store in advance the characteristic shape of that object class as the reference feature of that object. Such reference features can be calculated in advance by the second calculator 16 and stored in the memory 13. Moreover, such reference features can be allowed to be appropriately changed by user operations with respect to the input device 21B.

In the case of calculating the likelihood using the degree of similarity, the second calculator 16 calculates the likelihood of the persons 30B in each region P and the likelihood of the vehicles 30A in each region P using Equations (3) and (4) given below.

$$LB(P)=DB(P) \times CB \qquad (3)$$

$$LA(P)=DA(P) \times CA \qquad (4)$$

In Equation (3), LB(P) represents the likelihood of the persons 30B in the region P, and DB(P) represents the density of the persons 30B in the region P. Moreover, in Equation (3), CB represents the degree of similarity between the feature of the persons 30B, which are captured in the target region P for calculation, and the reference feature of the persons 30B.

In Equation (4), LA(P) represents the likelihood of the vehicles 30A in the region P, and DA(P) represents the density of the vehicles 30A in the region P. Moreover, in Equation (4), CA represents the degree of similarity between the feature of the vehicles 30A, which are captured in the target region P for calculation, and the reference feature of the vehicles 30A.

Regarding the calculation of the degree of similarity between a feature and the reference feature, the second calculator 16 can implement a known method. Moreover, the second calculator 16 can perform calculation in such a way that the degree of similarity is highest when the reference feature (for example, the reference feature of the vehicles 30A) is identical to the feature of the objects (for example, the vehicles 30A) in the target region P for likelihood calculation, and that the degree of similarity is lowest when the two features are totally different from each other.

Moreover, in the case of calculating the likelihood using the area as well as the degree of similarity, the second calculator 16 can calculate the likelihood as the multiplication result of multiplying the density of each object class captured in the region P by the area ratio and the degree of similarity. Meanwhile, if the degree of similarity is of a plurality of classes (such as colors and shapes); then the likelihood can be calculated as the multiplication result of multiplying the density of each object class captured in the region P by the area ratio and the degree of similarity of each class.

As a result of performing the operations described above, the second calculator 16 calculates, for each region P in the image 30, the likelihood of the objects of each class (i.e., for the vehicles 30A and the persons 30B). In the first embodiment, the second calculator 16 calculates the likelihood of the vehicles 30A captured in each region P and the likelihood of the persons 30B captured in each region P.

Returning to the explanation with reference to FIG. 1, the first generator 17 generates density data, in which the position corresponding to each region P in the image 30 is assigned with the density of the object class having the likelihood at least higher than the lowest likelihood from among the likelihoods of the objects captured in the corresponding region P.

For example, assume that the second calculator 16 calculates, for each region P, the likelihood of the vehicles 30A and the likelihood of the persons 30B. In that case, from among the likelihood of the vehicles 30A and the likelihood of the persons 30B calculated for each region P, the first generator 17 uses the likelihood higher than the lowest likelihood (herein, since there are only two classes of objects, the higher of the two likelihood) as the likelihood in the region P.

For example, regarding a particular region P, assume that the likelihood of the vehicles 30A is higher than the likelihood of the persons 30B. In that case, the second calculator 16 uses the likelihood of the vehicles 30A, which is the higher likelihood, as the likelihood in that particular region P. Then, to the position corresponding to that particular region P in the image 30, the second calculator 16 assigns the density of the vehicles 30A that represent the object class having the likelihood used in the region P. Herein, the assigned density is the density of the vehicles 30A that is calculated for that particular region P by the first calculator 15 (i.e., the density corresponding to the object class having the higher likelihood in that particular region P).

Conversely, regarding a particular region P, assume that the likelihood of the vehicles 30A is lower than the likelihood of the persons 30B. In that case, the second calculator 16 uses the likelihood of the persons 30B, which is the higher likelihood, as the likelihood in that particular region P. Then, to the position corresponding to that particular region P in the image 30, the second calculator 16 assigns the density of the persons 30B that represent the object class having the likelihood used in the region P. Herein, the assigned density is the density of the persons 30B that is calculated for that particular region P by the first calculator 15 (i.e., the density corresponding to the object class having the higher likelihood in that particular region P).

As described above, the first generator 17 generates density data, in which the position corresponding to each region P in the image 30 is assigned with the density of the object class having the likelihood at least higher than the lowest likelihood from among the likelihood of each object class captured in the corresponding region P.

Thus, if the likelihood in each region P is calculated for the objects of three or more classes, then the first generator 17 can treat the likelihood of any one class other than the class having the lowest likelihood as the likelihood used in the region P.

Meanwhile, it is desirable that the first generator 17 generates such density data in which the position corresponding to each region P in the image 30 is assigned with the density of the object class having the highest likelihood from among the likelihood of the each object class captured in the corresponding region P. Since the first generator 17 assigns, to each region P, the density of the object class having the highest likelihood; the density of each object class can be calculated with more accuracy in the density measuring device 10.

Figure 5A:
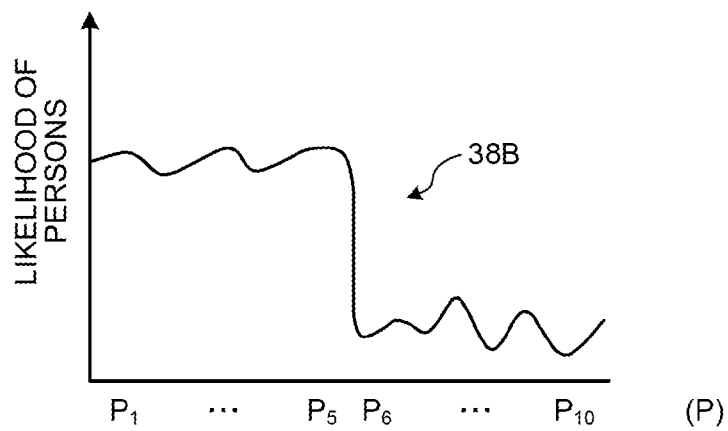
FIGS. 5A to 5C are explanatory diagrams for explaining the generation of density data.
Figure 5B:
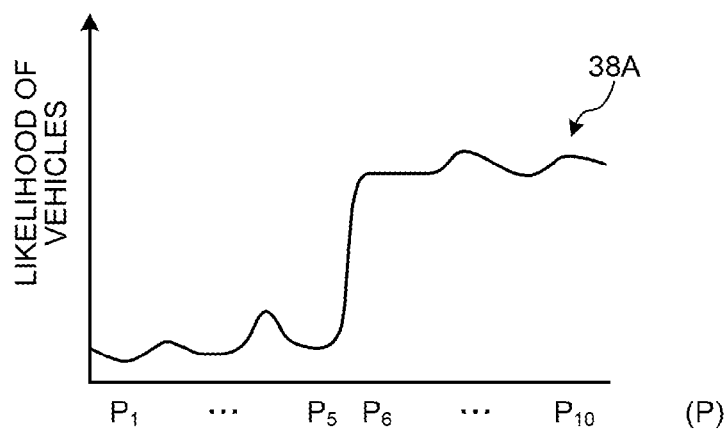
Figure 5C:
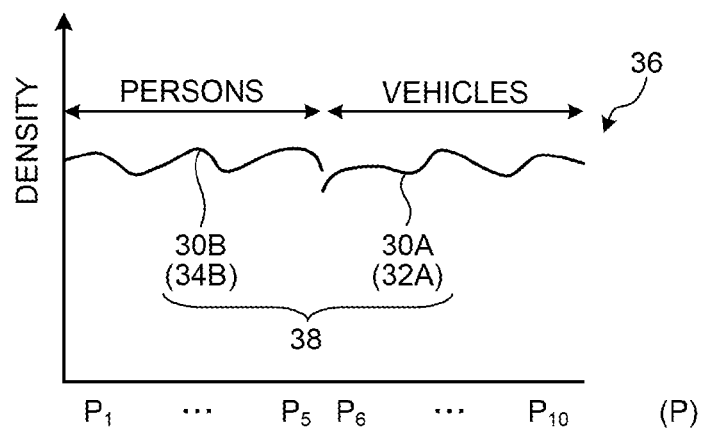

FIGS. 5A to 5C are explanatory diagrams for explaining the generation of density data by the first generator 17. For example, assume that the likelihood calculated by the second calculator 16 for each object class in each region P represents the relationship between line maps 38B and 38A illustrated in FIGS. 5A and 5B, respectively.

More specifically, assume that the likelihood of the persons 30B is higher in regions $P_1$ to $P_5$ in the image 30, and assume that the likelihood of the persons 30B is lower in regions $P_6$ to $P_{10}$ in the image 30 (see the line map 38B illustrated in FIG. 5A). On the other hand, assume that the likelihood of the vehicles 30A is lower in the regions $P_1$ to $P_5$ in the image 30, and assume that the likelihood of the vehicles 30A is higher in the regions $P_6$ to $P_{10}$ in the image 30 (see the line map 38A illustrated in FIG. 5B).

In that case, the first generator 17 assigns, to each region P, the likelihood-based density, and generates density data 38 illustrated in FIG. 5C. That is, the first generator 17 assigns, to the regions $P_1$ to $P_5$, the density 34B that corresponds to the likelihood of the persons 30B representing the object class having the higher likelihood in the regions $P_1$ to $P_5$. In contrast, the first generator 17 assigns, to the regions $P_6$ to $P_{10}$, the density 32A that corresponds to the likelihood of the vehicles 30A representing the object class having the higher likelihood in the regions $P_6$ to $P_{10}$. With that, the first generator 17 generates density data 36.

Regarding the flow of generating the density data, further explanation is given below with reference to FIG. 3.

As described above, regarding the image 30 illustrated in FIG. 3A, the first calculator 15 calculates the density of each object class captured in each region P. As a result of such calculation, the first calculator 15 calculates, for each region P, the density 32A of the vehicles 30A (see FIG. 3B) and the density 34B of the persons 30B (see FIG. 3C).

Meanwhile, there are times when errors occur in the density of the object class that is calculated for each region P by the first calculator 15. For example, in a region Q illustrated in FIG. 3C, regardless of the fact that the persons 30B are not present and only the vehicles 30A are present, there are times when the density 34B indicating the presence of the persons 30B is calculated. That happens due to, for example, false determination about the object class.

Meanwhile, in the first embodiment, the density measuring device 10 includes the second calculator 16 and the first generator 17. As described above, the first generator 17 generates density data using the likelihood calculated by the second calculator 16 for each object class captured in each region P.

FIG. 3D is a schematic diagram illustrating an example of the density data 36. In the density data 36, the position corresponding to each region P in the image 30 is assigned with the density of the object class having the higher likelihood in that region P. Hence, in the density data 36, the errors attributed to false determination of the object classes are reduced.

More particularly, the densities 34B of the persons 30B, as calculated by the first calculator 15 and illustrated in FIG. 3C, includes the region Q in which the presence of the persons 30B is falsely determined. However, since the first generator 17 generates density data based on the likelihoods, the region Q in the generated density data 36 is assigned with the density of the vehicles 30A as illustrated in FIG. 3D. Thus, in the density data 36, false determination is held down.

Returning to the explanation with reference to FIG. 1, based on the density data generated by the first generator 17, the third calculator 18 calculates the density of each object class in the image 30. As described above, in the density data generated by the first generator 17, each region P in the image 30 is assigned with the density of the object class having the higher likelihood than the lowest likelihood. For that reason, the third calculator 18 reads the density of each object class that is assigned to each region P in the image 30. Then, from the density of each object class that is read from all regions P specified in the density data, the third calculator 18 calculates the average density of the object class. With that, the third calculator 18 calculates the density of each object class captured across the image 30.

For example, assume that the density data represents data in which each region P in the image 30 is assigned with the density of the object class (the vehicles 30A or the persons 30B) having the higher likelihood. In that case, the third calculator 18 reads, from the density data, the density assigned to each region P and the object class (the vehicles 30A or the persons 30B) corresponding to the density. Then, for each object class (the vehicles 30A or the persons 30B) that is read, the third calculator 18 calculates the average value of the total density as the density of the object class.

The second generator 19 generates, from the density data generated by the first generator 17, a display image in which the position corresponding to each region P in the image 30 is illustrated with the color corresponding to the assigned object class and with the concentration corresponding to the assigned density at the position of the region P.

For example, the second generator 19 generates a display image 37 illustrated in FIG. 3D. As illustrated in FIG. 3D, in the display image 37, the position corresponding to each region P is illustrated with the color corresponding to the assigned object class and with the concentration corresponding to the assigned density at the position of the region P.

More specifically, in the display image 37 illustrated in FIG. 3D, at the position corresponding to each region P in the image 30, the density 32A (one of the densities $32A_1$ to $32A_4$) of the vehicles 30A is illustrated with the color corresponding to the vehicles 30A and the concentration corresponding to the density according to the density data 36. In the example illustrated in FIG. 3D, higher the density 32A (one of the densities $32A_1$ to $32A_4$) at a position, the darker is the color at that position. In an identical manner, at the position corresponding to each region P in the image 30, the density 34B (one of the densities $34B_1$ to $34B_4$) of the persons 30B is illustrated with the color corresponding to the persons 30B and the concentration corresponding to the density according to the density data 36. Thus, for example, higher the density 34B (one of the densities $34B_1$ to $34B_4$) at a position, the darker is the color at that position.

The second generator 19 reads, from the density data, the assigned object class and the assigned density at the position corresponding to each region P; illustrates the color corresponding to the assigned object class and the concentration corresponding to the assigned density at the corresponding position; and generates the display image 37.

Meanwhile, the colors corresponding to the object classes can be stored in advance in the memory 13. Thus, the second generator 19 can read the colors corresponding to the object classes specified in the density data, and can obtain the colors corresponding to the object classes captured in the display image 37. Moreover, the concentrations corresponding to the densities can also be stored in advance in the memory 13. Then, the second generator 19 can read the concentrations corresponding to the densities of the objects specified in the density data, and can use the concentrations in generating the display image 37.

Returning to the explanation with reference to FIG. 1, the display controller 20 performs control to display various images on the display 21A. In the first embodiment, the display controller 20 displays, on the display 21A, the density data generated by the first generator 17 and the display image 37 generated by the second generator 19.

For example, when the display controller 20 displays the display image 37 on the display 21A, the display image 37 illustrated in FIG. 3D gets displayed. Hence, in the density measuring device 10 according to the first embodiment, the density of each object class captured in the image 30 can be provided to the user in an easy-to-understand manner.

Figure 6:
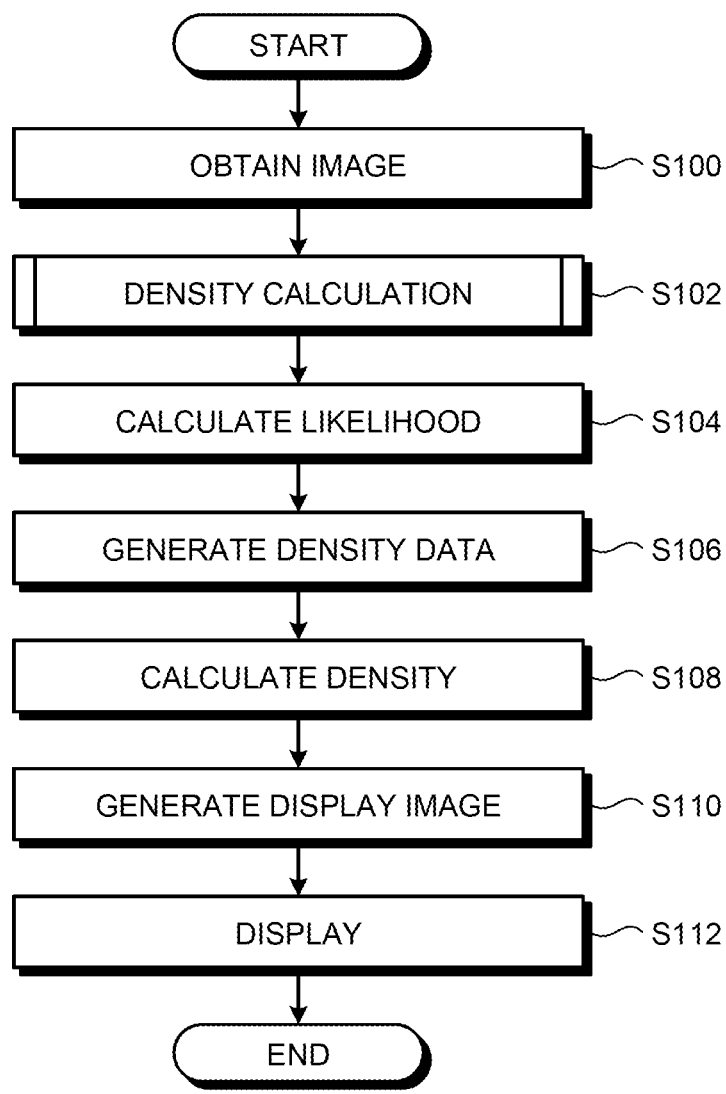
FIG. 6 is a flowchart for explaining the sequence of operations during a density measurement operation.

Given below is the explanation of the sequence of operations during a density measurement operation performed in the density measuring device 10. FIG. 6 is a flowchart for explaining the sequence of operations during a density measurement operation.

Firstly, the obtainer 14 obtains the target image 30 for density measurement (Step S100). Then, the first calculator 15 calculates, from the image 30 obtained at Step S100, the density of each object class captured in each of a plurality of regions P formed by dividing the image 30 (Step S102).

Subsequently, from the density of each object class captured in each region P as per the calculation at Step S102, the second calculator 16 calculates the likelihoods of the object classes captured in each region P (Step S104).

Then, the first generator 17 generates density data, in which the position corresponding to each region P in the image 30 is assigned with the density of the object class having the likelihood at least higher than the lowest likelihood from among the likelihood of the each object class captured in the corresponding region P (Step S106).

Subsequently, the third calculator 18 calculates the density of each object class in the image 30 based on the density data generated by the first generator 17 at Step S106 (Step S108).

Then, the second generator 19 generates the display image 37 from the density data generated at Step S106 (Step S110).

Subsequently, the display controller 20 displays the display image 37, which is generated at Step S110, on the display 21A (Step S112). That marks the end of the present routine.

Meanwhile, the controller 12 can store the density data, which is generated at Step S106, in association with the image 30, which is obtained at Step S100, in the memory 13. Moreover, the controller 12 can store the density of each object class captured in the image 30 as calculated at Step S108 and the display image 37 generated at Step S110 in association with the image 30, which is obtained at Step S100, in the memory 13.

As explained above, the density measuring device 10 includes the first calculator 15, the second calculator 16, and the first generator 17. The first calculator 15 calculates, from the image 30 that includes the objects of a plurality of classes classified according to a predetermined rule, the density of each object class captured in each of a plurality of regions P formed by dividing the image 30. The second calculator 16 calculates, from the calculated density of each object class in each region P, the likelihoods of the object classes in each region P. The first generator 17 generates density data, in which the position corresponding to each region P in the image 30 is assigned with the density of the object class having the likelihood at least higher than the lowest likelihood from among the likelihood of the each object class captured in the corresponding region P.

In this way, in the density measuring device 10 according to the first embodiment, the density data is generated using the likelihoods of the object classes as obtained for each region P in the image 30. Hence, in the density measuring device 10 according to the first embodiment, it becomes possible to hold down a decline in the density each object class calculation accuracy attributed to false determination of the object classes captured in the image 30.

Thus, in the density measuring device 10 according to the first embodiment, it becomes possible to accurately calculate the density of each object class captured in the image 30.

Meanwhile, in the first embodiment, as an example of the target image for density measurement, the image 30 is used in which the vehicles 30A and the persons 30B are captured. However, as described above, in the first embodiment, an image including the objects of a plurality of classes is not limited to an image including the vehicles 30A and the persons 30B.

Figure 7:
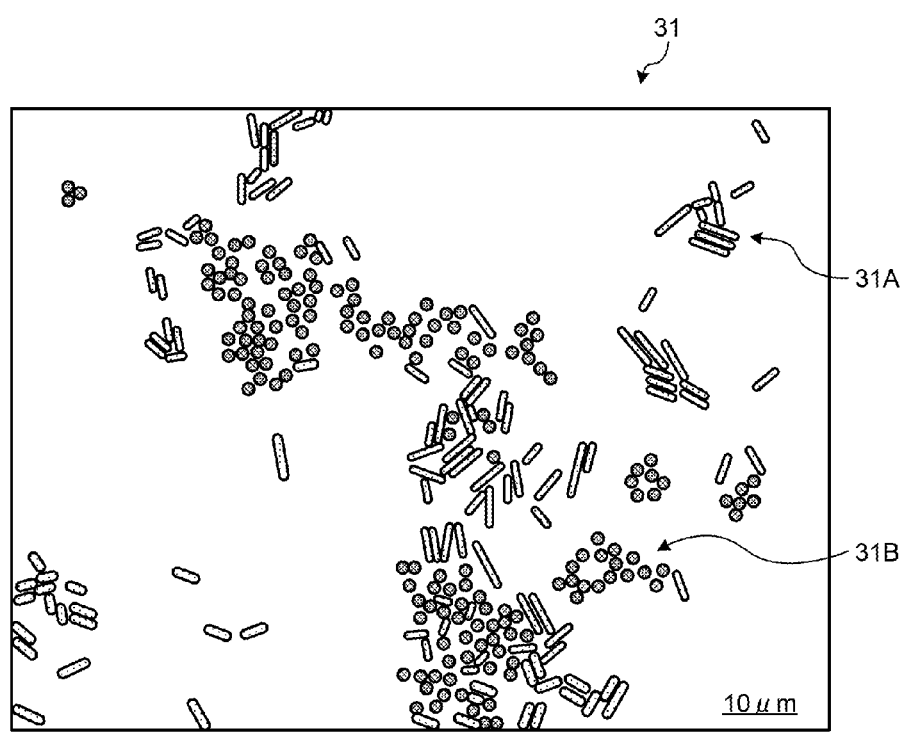
FIG. 7 is a schematic diagram illustrating another example of the target image for density measurement.

FIG. 7 is a schematic diagram illustrating another example of the target image for density measurement. For example, in the density measuring device 10, it is possible to use an image 31 illustrated in FIG. 7 as the target image for density measurement. In the image 31, circular cells 31B and elongated cells 31A are captured as the objects of a plurality of classes.

In this way, as long as images include the objects of a plurality of classes classified according to a predetermined rule, an image having any object classes can be treated as the target image for density measurement in the density measuring device 10 according to the first embodiment. For example, in the density measuring device 10, an image including a plurality of classes of cells as the objects of a plurality of classes can be treated as the target image for density measurement.

Meanwhile, in the first embodiment, it has been explained that the first calculator 15 may implement any known method for calculation.

However, during the calculation performed by the first calculator 15, it is desirable that the operation for calculating the density of each object class captured in each region P is performed for each the object class captured in the image 30. Moreover, it is desirable that, prior to performing the calculation operation for each of the object classes, the first calculator 15 performs preprocessing that includes at least either a reduction operation for reducing the size of the objects of the classes other than the object class of target objects for calculation in the image 30 or a correction operation for correcting the colors of the objects classes other than the class of target objects for calculation, to be the background color. Thus, it is desirable that the calculation operation is performed after the preprocessing. A specific example of the preprocessing is explained later in a second embodiment.

When the first calculator 15 performs the preprocessing, there is an enhancement in the accuracy of calculation of the density of each object class. Hence, when the first calculator 15 performs the preprocessing, the density of each object class captured in the image 30 can be calculated with more accuracy in the density measuring device 10 according to the first embodiment.

Second Embodiment

In the second embodiment, the explanation is given for an example of the density calculation operation performed by the first calculator 15 in the density measuring device 10.

Figure 8:
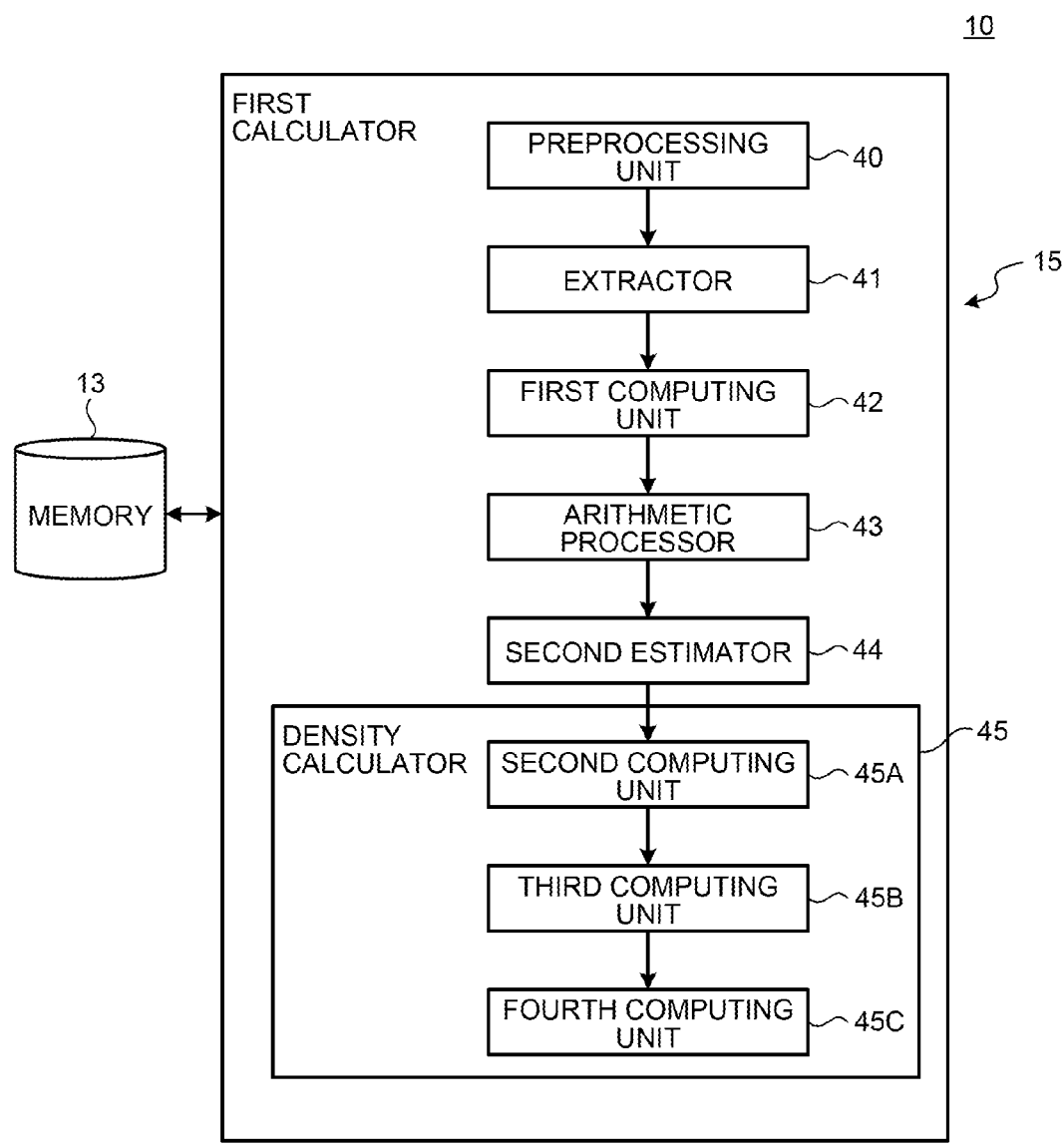
FIG. 8 is a block diagram illustrating an exemplary configuration of a first calculator.

FIG. 8 is a block diagram illustrating an exemplary configuration of the first calculator 15 disposed in the density measuring device 10.

The first calculator 15 includes a preprocessing unit 40, an extractor 41, a first computing unit 42, an arithmetic processor 43, a second estimator 44, and a density calculator 45.

Herein, some or all of the preprocessing unit 40, the extractor 41, the first computing unit 42, the arithmetic processor 43, the second estimator 44, and the density calculator 45 can be implemented by making a processor such as a CPU execute computer programs, that is, can be implemented using software; or can be implemented using hardware such as an integrated circuit (IC); or can be implemented using a combination of software and hardware.

The first calculator 15 performs the calculation operation for each object class. In the calculation operation, the density of each object class captured in each region P is calculated from the image 30 obtained from the obtainer 14 (see FIG. 1).

For example, when the image 30 includes the vehicles 30A and the persons 30B, the first calculator 15 performs the calculation operation for calculating the density of the vehicles 30A captured in each region P of the image 30, and then performs the calculation operation for calculating the density of the persons 30B captured in each region P of the image 30.

The preprocessing unit 40 performs preprocessing, which includes at least either the reduction operation or the correction operation, before performing the calculation operation for calculating the density of each object class. The reduction operation includes reducing the size of the objects of the classes other than the class of the target objects for calculation in the image 30. In the correction operation, the colors of the object classes other than the class of the target object for calculation are corrected to be the background color. Herein, correction to be the background color implies that the portion other than the class of the target objects for calculation in the image 30 is corrected to a different color than the class of the target object to be calculated.

Figure 9A:
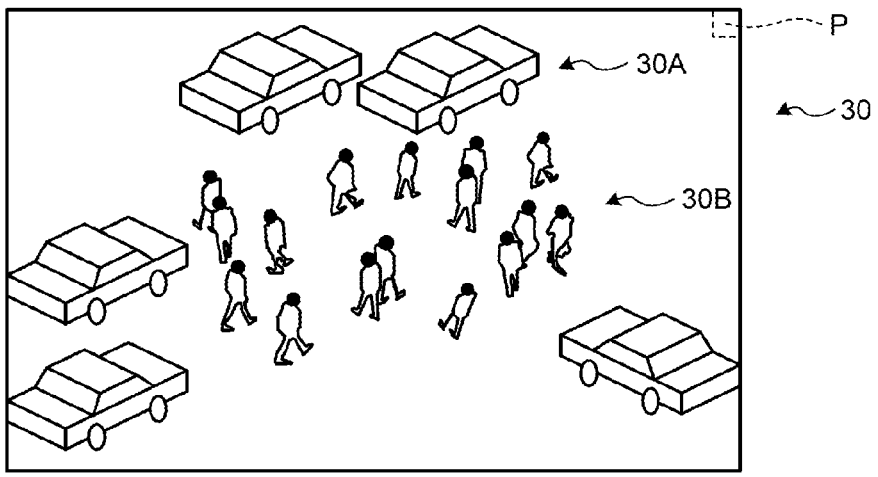
FIGS. 9A to 9C are explanatory diagrams for explaining preprocessing.
Figure 9B:
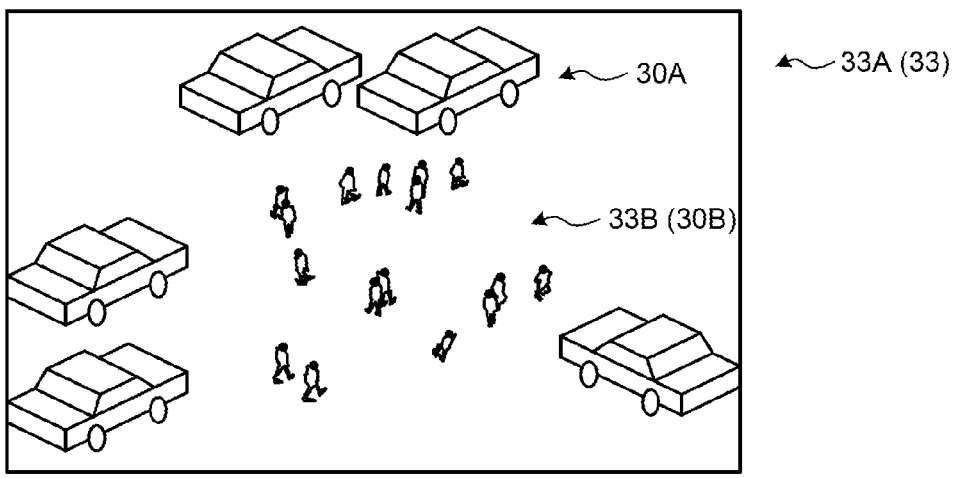
Figure 9C:
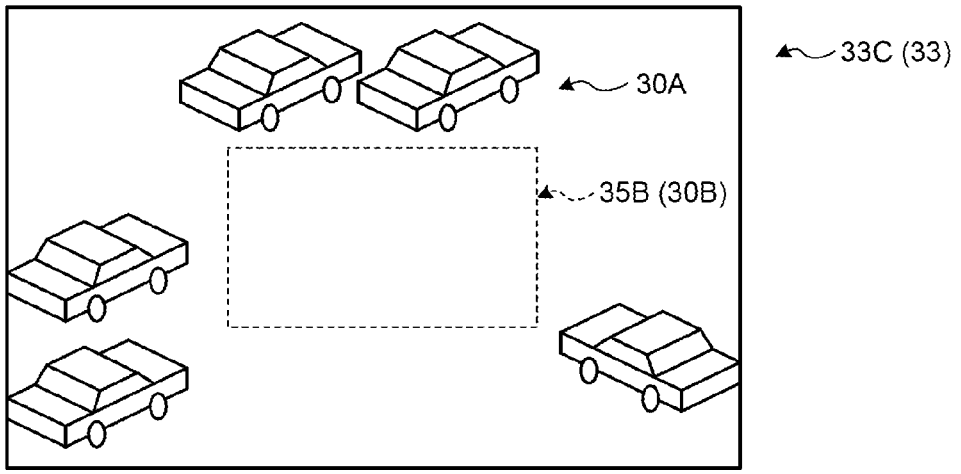

FIGS. 9A to 9C are explanatory diagrams for explaining the preprocessing. Assume that, in the image 30 illustrated in FIG. 9A, the first calculator 15 calculates the object-by-object density in each region P. Herein, in an identical manner to the image 30 explained in the first embodiment, the image 30 illustrated in FIG. 9A includes the vehicles 30A and the persons 30B.

When the first calculator 15 intends to calculate the density of the vehicles 30A as the target for density calculation in each region P, the preprocessing unit 40 reduces the size of the persons 30B, the object class of which is different from the object class of the vehicles 30A in the image 30 (see a person region 33B in FIG. 9B); and treats the image 30 as a correction image 33A.

Moreover, when the first calculator 15 intends to calculate the density of the vehicles 30A as the target for density calculation in each region P, the preprocessing unit 40 corrects the colors of the persons 30B, the object class of which is different from the object class of the vehicles 30A in the image 30, to be the background color (see a person region 35B in FIG. 9C); and treats the image 30 as a correction image 33C.

Then, the first calculator 15 performs the calculation operation with respect to the vehicles 30A captured in the image 30.

Similarly, the preprocessing unit 40 reduces the size of the vehicles 30A, the object class of which is different from the object class of the persons 30B in the image 30; and treats the image 30 as a correction image. Moreover, the preprocessing unit 40 corrects the colors of the vehicles 30A, the object class of which is different from the object class of the persons 30B in the image 30, to be the background colors; and treats the image 30 as a correction image. Then, the first calculator 15 performs the calculation operation with respect to the persons 30B captured in the image 30.

Returning to the explanation with reference to FIG. 8, at the time of calculating the density of the vehicles 30A captured in each region P of the image 30; the extractor 41, the first computing unit 42, the arithmetic processor 43, the second estimator 44, and the density calculator 45 perform operations (described later) using the correction image 33A or the correction image 33C. In the following explanation, in the case of collectively referring to the correction images (such as the correction image 33A and the correction image 33C) obtained by the preprocessing unit 40 by performing correction, they are referred to as a correction image 33 (see FIG. 9).

The extractor 41 extracts a plurality of partial images from the image 30.

A partial image is an image of some portion of the correction image 33, and includes at least a single object. The correction image 33 is an image in which the object/objects of the class/classes other than the class of the target object/objects for calculation is/are reduced in size or has/have the same color as the background color. Hence, a partial image includes at least a single object of the class of target objects for calculation (such as at least the vehicle 30A or the person 30B) captured in the correction image 33.

In the second embodiment, the explanation is given for a case in which each partial image is formed by extracting some portion of the correction image 33 in a rectangular manner. However, the shape of partial images is not limited to the rectangular shape, and any arbitrary shape can be used.

FIGS. 10A to 10D are explanatory diagrams for explaining the correction image 33, partial images 50, and a label 51 (details given later).

Figure 10A:
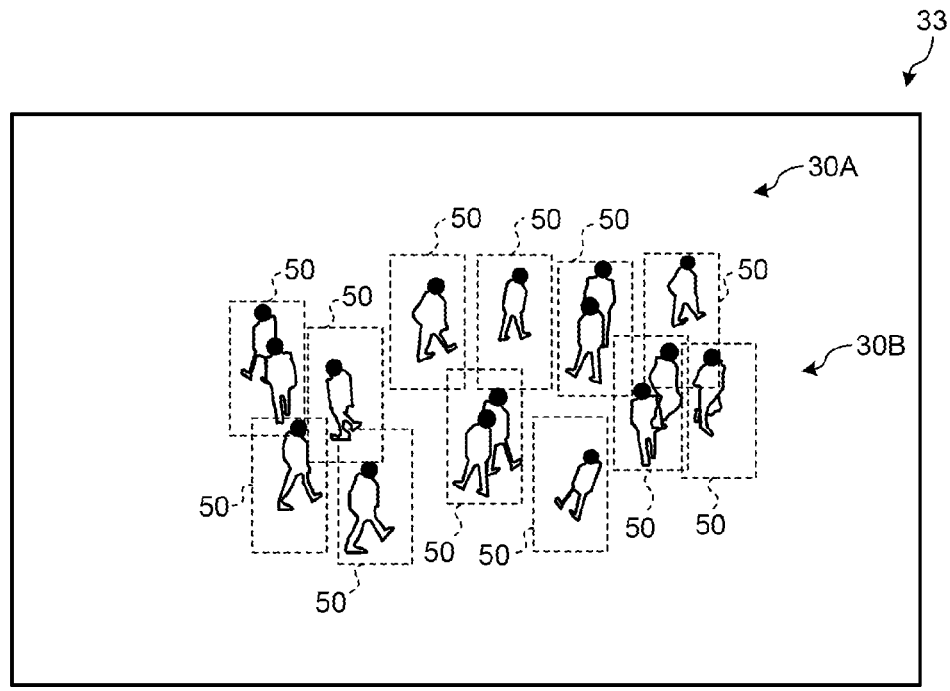
FIGS. 10A to 10D are explanatory diagrams for explaining a correction image, partial images, and a label.
Figure 10B:
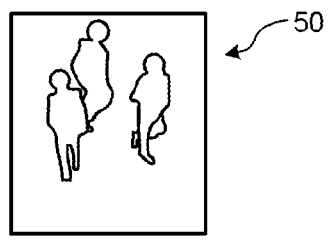
Figure 10C:
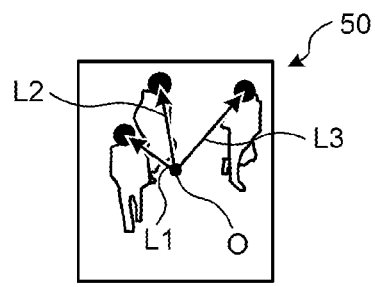
Figure 10D:
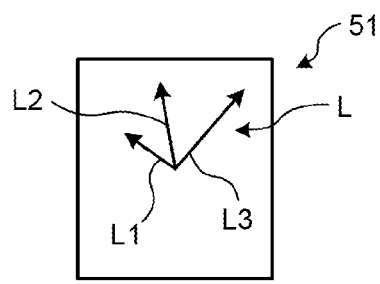

FIG. 10A is a schematic diagram illustrating an example of the correction image 33. In the correction image 33 illustrated in FIG. 10A, the persons 30B captured in the image 30 represent the class of target objects for density calculation, and the vehicles 30A are corrected to be reduced in size or to have the same color as the background color. FIG. 10B is a diagram illustrating an example of the partial image 50.

The extractor 41 moves, in the image 30, rectangular areas to be extracted and extracts a plurality of partial images 50 (see FIG. 10A). The partial images 50 extracted from the image 30 are of the same size and same shape.

Moreover, the partial images 50 extracted from the correction image 33 can have at least some overlapping portion therebetween. As long as the extractor 41 extracts two or more partial images 50 from the correction image, it serves the purpose. However, it is desirable to have as many extracted partial images 50 as possible. More particularly, it is desirable that the extractor 41 extracts 1000 or more partial images 50 from the correction image 33.

Greater the number of partial images 50 extracted from the correction image 33 by the extractor 41, the greater is the possibility that the first calculator 15 learns a regression model that enables density calculation with accuracy during the operations described later.

Returning to the explanation with reference to FIG. 8, the first computing unit 42 calculates the feature quantity of each partial image 50 that is extracted by the extractor 41. The feature quantity is a value representing the feature of the corresponding partial image 50. Examples of the feature quantity include a value obtained by discretizing the pixel values of the pixels constituting the partial image and arranging the discretized pixel values in one dimension, and a value obtained by normalizing the abovementioned value using the difference (i.e., the gradient) in neighboring pixel values among the pixel values arranged in one dimension. Alternatively, as the feature quantity, it is also possible to use the SIFT feature (see D. Lowe, "Object recognition from local scale-invariant features", Int. Conf. Comp. Vision, Vol. 2, pp. 1150-1157, 1999). The SIFT feature is a histogram feature that is robust against minute variations.

Figure 11:
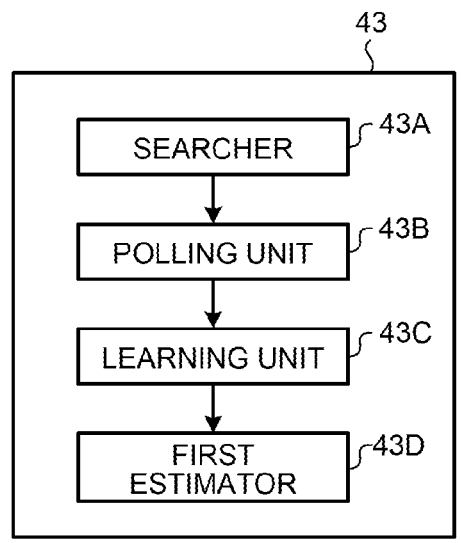
FIG. 11 is a block diagram illustrating an exemplary configuration of an arithmetic processor.

The arithmetic processor 43 calculates a regression model and representative labels. FIG. 11 is a block diagram illustrating an exemplary configuration of the arithmetic processor 43.

The arithmetic processor 43 includes a searcher 43A, a polling unit 43B, a learning unit 43C, and a first estimator 43D. Herein, some or all of the searcher 43A, the polling unit 43B, the learning unit 43C, and the first estimator 43D can be implemented by making a processor such as a CPU execute computer programs, that is, can be implemented using software; or can be implemented using hardware such as an integrated circuit (IC); or can be implemented using a combination of software and hardware.

The searcher 43A attaches a label to the feature quantity of each partial image 50. A label represents the relative positions between the objects captured in the corresponding partial image 50 and a first position in that partial image 50. More particularly, firstly, the searcher 43A searches for the objects captured in each partial image 50 extracted by the extractor 41. Then, for each partial image 50, the searcher 43A generates, as the label, a vector representing the relative positions between the first position in the partial image 50 and all objects captured in that partial image 50. Then, the searcher 43A attaches the generated label to the feature quantity of the corresponding partial image 50.

Herein, the first position can be a predetermined arbitrary position in the partial image. In the second embodiment, the explanation is given under the assumption that the first position represents the center position of the partial image 50 (the center of the partial image 50).

Returning to the explanation with reference to FIG. 10; FIGS. 10C and 10D are explanatory diagrams for explaining the label 51. For example, the searcher 43A searches for the objects captured in each partial image 50 illustrated in FIG. 10B. Then, the searcher 43A generates vectors L1, L2, and L3 (see FIG. 10C) that represent relative positions between a central position O of the partial image 50 and all objects captured in the partial image 50 (in the example illustrated in FIGS. 10B and 10C, three objects). Subsequently, to the feature quantity of the partial image 50, the searcher 43A attaches a vector L, which represents a set of the vectors L1, L2, and L3, as the label 51 (see FIG. 10D).

Returning to the explanation with reference to FIG. 11, the polling unit 43B calculates, for each partial image 50, a histogram representing the distribution of the relative positions of the objects captured in that partial image 50.

Figure 12:
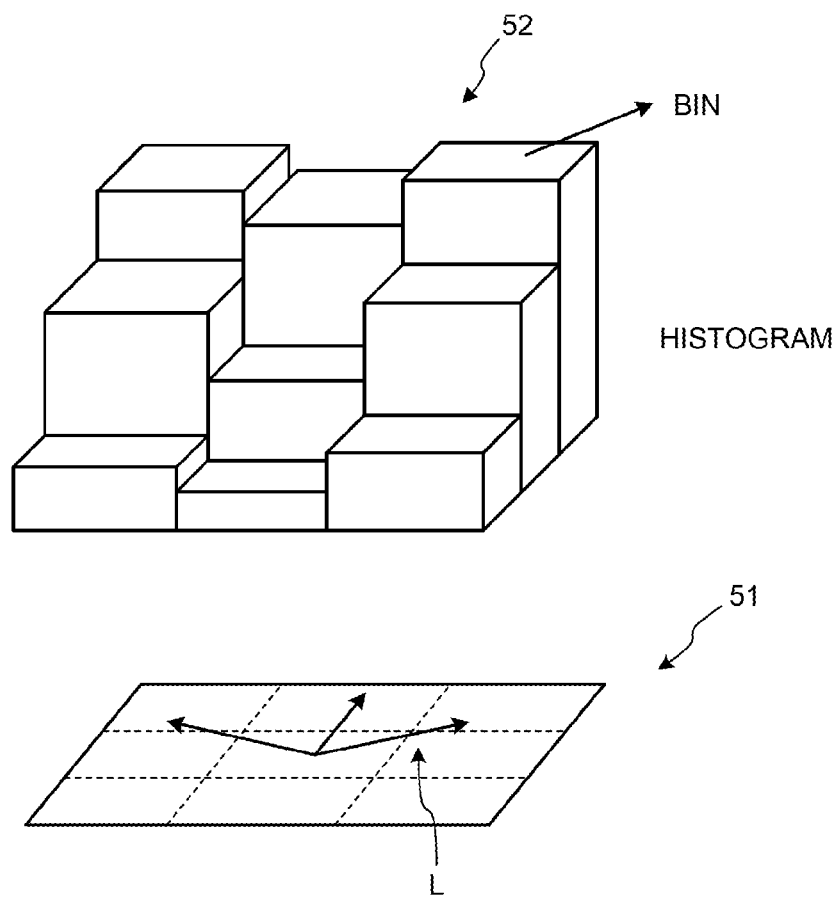
FIG. 12 is an explanatory diagram for explaining the label and a histogram.

FIG. 12 is an explanatory diagram for explaining the label 51 and a histogram 52. As illustrated in FIG. 12, the polling unit 43B calculates the histogram 52 from the label 51.

The histogram 52 is a set of bins that are evenly arranged in the partial image 50. The size of the bins in the histogram 52 is determined based on the relative positions of the objects captured in the partial image 50. For example, the size of the bin at a position b in the partial image is expressed using Equation (5) given below.

$$B(b) = \Sigma N(b; oj, \sigma) \quad (5)$$

In Equation (5), B(b) represents the size of the bin at the position b in the partial image 50. Moreover, oj represents the position of an object. Furthermore, in Equation (5), N(b; oj, σ) represents the value of the probability density function of a normal distribution of (center oj, dispersion σ) at the position b.

Returning to the explanation with reference to FIG. 11, subsequently, the polling unit 43B polls the histogram 52 calculated for each partial image 50 into a parametric space. As a result, the polling unit 43B generates a polling histogram for each partial image 50.

Figure 13:
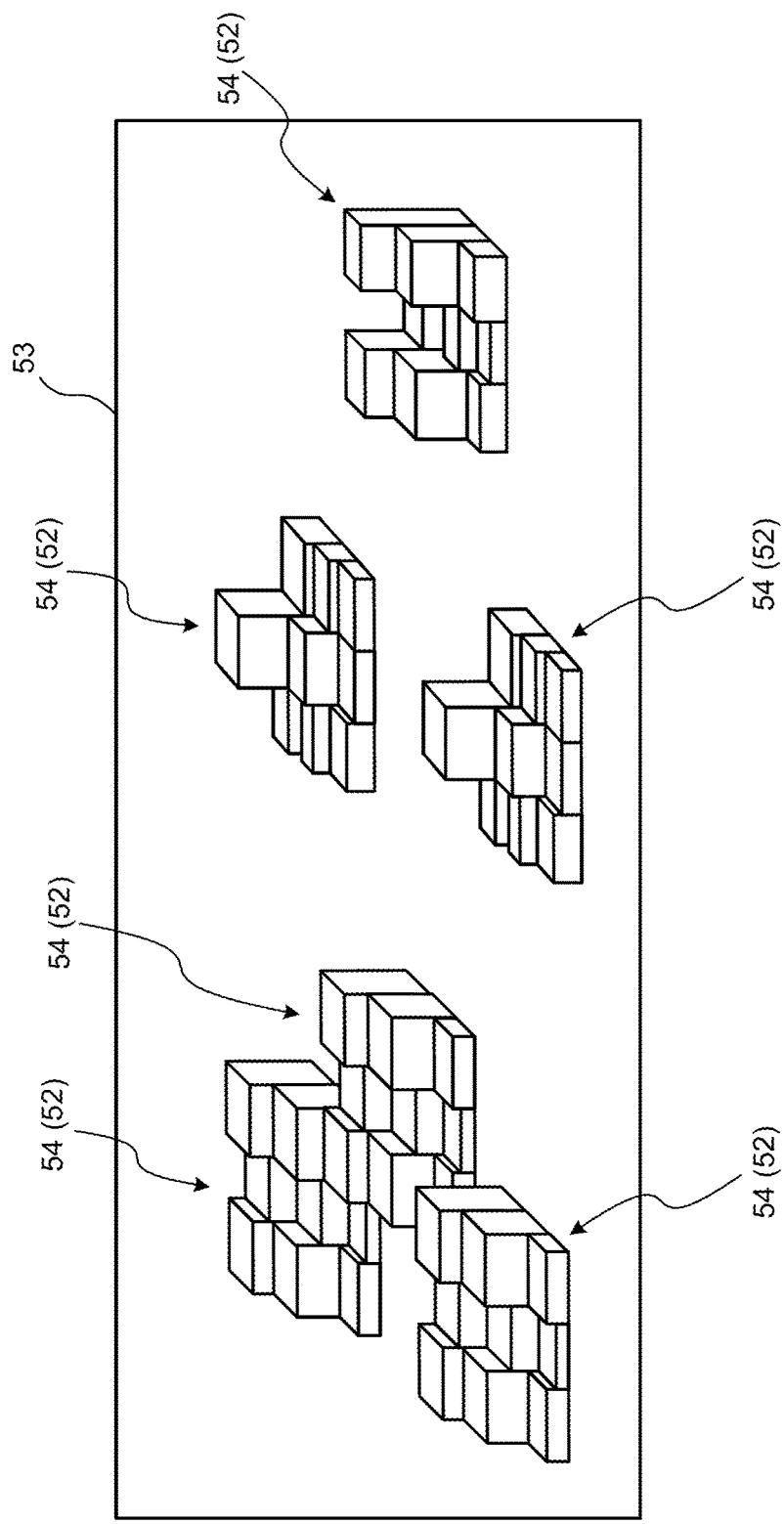
FIG. 13 is an explanatory diagram for explaining polling histograms.

FIG. 13 is an explanatory diagram for explaining polling histograms 54. When the histograms 52 are polled into the parametric space, it results in the generation of the polling histograms 54. In FIG. 13, the parametric space is simplified to two dimensions.

In the second embodiment, the explanation is given under the assumption that the parametric space is a three-dimensional parametric space (x, y, s). Herein, (x, y) represents a two-dimensional position (x, y) in the partial image. Moreover, (s) represents the size (s) of objects. Meanwhile, the parametric space can be a multidimensional parametric space in which the posture and orientation of the objects is added to the parameters mentioned above.

Returning to the explanation with reference to FIG. 11, the learning unit 43C learns a regression model that represents the relationship between the feature quantities of the partial images 50 and the relative positions of the objects captured in those partial images 50. More particularly, the learning unit 43C learns a regression model by dividing the feature quantity that has the label 51 attached thereto and that corresponds to each partial image 50 into a plurality of clusters in such a way that there is a decrease in the variability in the corresponding polling histogram.

In the second embodiment, the explanation is given for a case in which the regression model represents one or more random trees. A plurality of random trees represents a random forest. In the second embodiment, a cluster implies a leaf node that is an end node of a random tree.

In the second embodiment, learning of a regression model by the learning unit 43C implies determining a division index of each node from the root node to leaf nodes via child nodes in a random tree and determining the feature quantities belonging to leaf nodes. Herein, the feature quantities are attached with the label 51 as described above.

In the second embodiment, the learning unit 43C learns the regression model by determining the division index of each node from the root node to a plurality of leaf nodes via child nodes, and determines the feature quantities belonging to the leaf nodes in such a way that there is a decrease in the variability in the polling histogram 54.

Meanwhile, it is desirable that the learning unit 43C learns a plurality of regression models having different combinations of division indexes. In the second embodiment, the learning unit 43C varies the combinations of the division indexes of nodes, and learns a predetermined number of (hereinafter, referred to as T number of) regression models.

Figure 14:
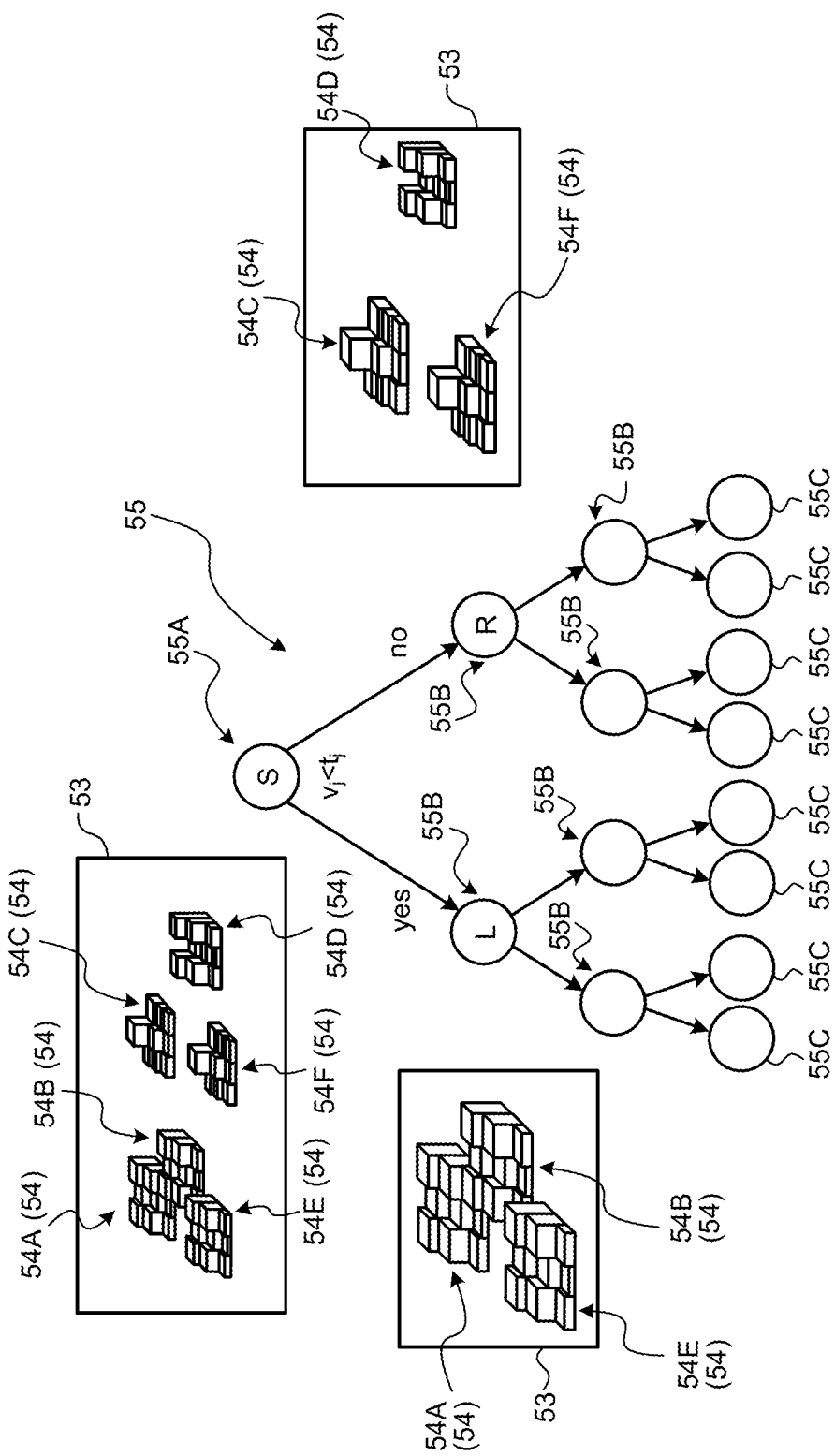
FIG. 14 is an explanatory diagram for explaining a random tree.

FIG. 14 is an explanatory diagram for explaining a random tree 55.

In FIG. 14 are illustrated the polling histograms 54 in a parametric space 53 that is simplified to two dimensions. In the example illustrated in FIG. 14, polling histograms 54A to 54F represent the polling histograms 54 corresponding to the feature quantities of a plurality of partial images 50. In the following explanation, the feature quantity of the partial image 50 is sometimes referred to as a feature quantity v, which has a label attached thereto as described above.

Firstly, the learning unit 43C assigns, to "S" representing a root node 55A, all feature quantities v that have labels attached thereto and that are calculated by the first computing unit 42 and the searcher 43A.

Then, the learning unit 43C determines the division index at the time of dividing "S", which represents the root node 55A, into "L" and "R" representing two child nodes 55B. The division index is determined according to an element vj of the feature v and a threshold value tj.

More particularly, the learning unit 43C determines the division index of the node to be divided in such a way that the variability in the polling histogram is small in the nodes obtained by division (the child nodes 55B or leaf nodes 55C). The division index is determined according to the element vj of the feature v and the threshold value tj.

More specifically, the learning unit 43C determines the division index in the case in which the labeled feature quantity v satisfying the relationship "element vj<threshold value tj" is tentatively assigned to "L" representing the child node 55B (in the case of "yes" in FIG. 14) and the feature quantity v not satisfying the relationship "element vj<threshold value tj" is tentatively assigned to "R" representing the child node 55B (in the case of "no" in FIG. 14) (hereinafter, this operation is referred to as a tentative assignment operation).

At that time, the learning unit 43C determines the division index of the feature quantity v in such a way that there is a decrease in the variability in the polling histogram 54. For example, the learning unit 43C determines the division index using Equation (6) given below.

$$G=\Sigma\{H(l)-HL\}^2+\Sigma\{H(r)-HR\}^2 \qquad \text{Equation (6)}$$

In Equation (6), H(l) represents the polling histograms 54 in which "S" representing the root node 55A is divided into "L" representing the child nodes 55B. Moreover, in Equation (6), H(r) represents the polling histograms 54 in which "S" representing the root node 55A is divided into "R" representing the child nodes 55B. Furthermore, in Equation (6), HL represents the average value of all pixel histograms H(l), and HR represents the average value of all pixel histograms H(r).

However, the method implemented by the learning unit 43C for determining the division index is not limited to Equation (6).

For each node, the learning unit 43C determines the division index in such a way that the variability of the polling histogram 54 is the smallest, and repeats the tentative assignment operation from the root node 55A to the leaf nodes 55C via the child nodes 55B. That is, for each node, the learning unit 43C determines, as the division index, a combination of the element vj and the threshold value tj in such a way that the value of G given in Equation (6) becomes the smallest; and repeats dividing the feature quantity v belonging to each node.

Then, the learning unit 43C determines, as the leaf nodes 55C present at the end, the nodes at the time of satisfying an end condition. Herein, the end condition is, for example, at least one of a first condition, a second condition, and a third condition. The first condition is that the number of feature quantities v included in the nodes is smaller than a predetermined number. The second condition is that the tree structure of the random tree 55 has a greater depth than a predetermined value. The third condition is that the value of the division index is smaller than a predetermined value.

By determining the leaf nodes 55C, the learning unit 43C learns the feature quantity v belonging to the leaf nodes 55C.

As described above, the learning unit 43C determines the division index of each node starting from the root node 55A to the leaf nodes 55C via the child nodes 55B, determines the feature quantities v belonging to the leaf nodes 55C; and learns the random tree 55. Moreover, the learning unit 43C performs the tentative assignment operation by varying the combination of division indexes, and learns a predetermined T number of random trees 55.

Herein, the T number of random trees 55 learnt by the learning unit 43C can be equal to one or can be an arbitrary number equal to or greater than two. Greater the number of random trees 55 learnt by the learning unit 43C from the correction image 33, the greater is the possibility that the first calculator 15 learns the random trees 55 that enable density calculation with accuracy in the density measuring device 10. Thus, it is desirable that the learning unit 43C learns a random forest representing a plurality of random trees 55.

Figure 15:
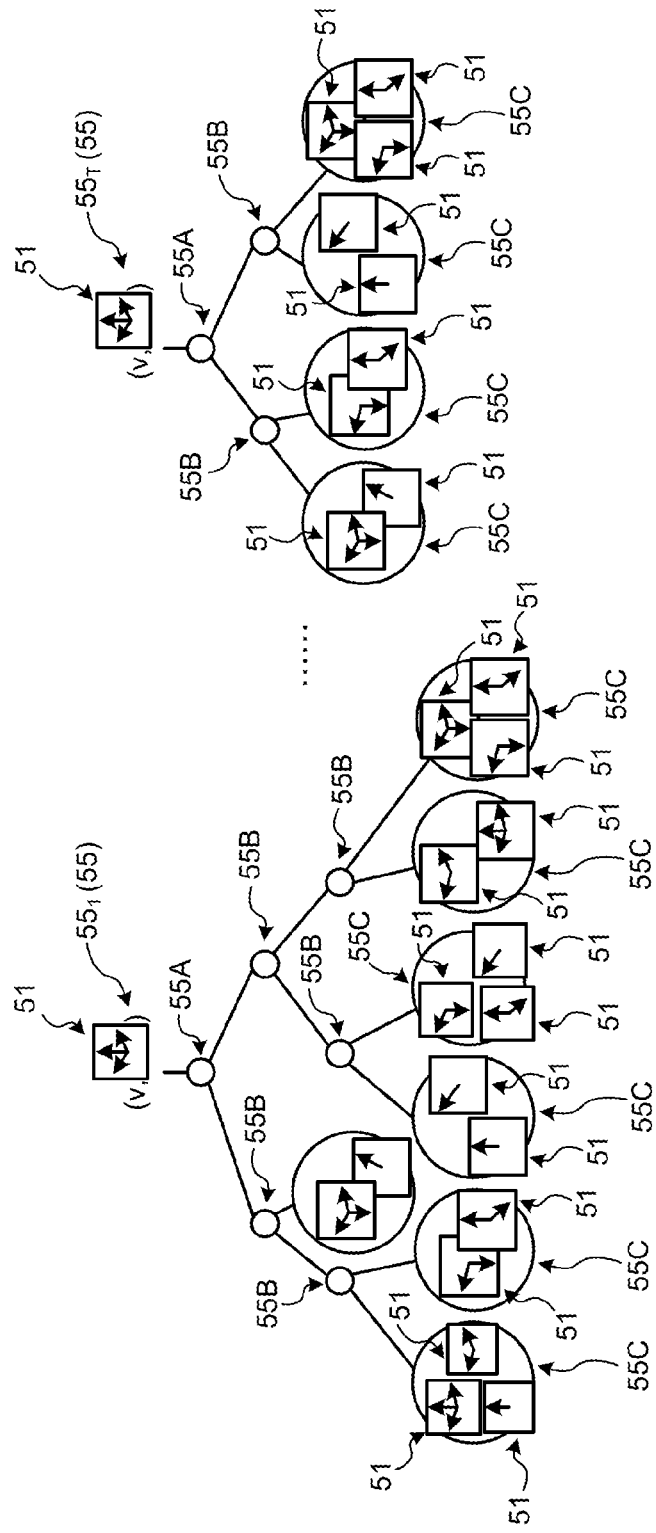
FIG. 15 is an explanatory diagram for explaining a random forest.

FIG. 15 is an explanatory diagram for explaining a plurality of random trees 55 (i.e., a random forest) that is learnt. Each of a random tree $55_1$ to a random tree $55_T$ has a different division index for each node. Hence, for example, even if all feature quantities v that have the label 51 attached thereto and that are assigned to the root node 55A are same, there are times when the random tree $55_1$ to the random tree $55_T$ have different labeled feature quantities belonging to the leaf nodes 55C. Meanwhile, in the example illustrated in FIG. 15, although only the labels 51 are illustrated for the leaf nodes 55C, it is actually the feature quantity v attached with the label 51 that belongs to each leaf node 55C.

Returning to the explanation with reference to FIG. 11, the first estimator 43D estimates the representative label for each cluster obtained by means of division by the learning unit 43C during the learning. The first estimator 43D estimates the representative label from the labels 51 attached to one or more feature quantities v belonging to the cluster.

As described above, in the second embodiment, a cluster implies the leaf node 55C that is a node at the end of the random tree 55. Hence, the first estimator 43D estimates the representative label of each leaf node 55C from the labels 51 attached to all feature quantities v belonging to the leaf node 55C.

Figure 16:
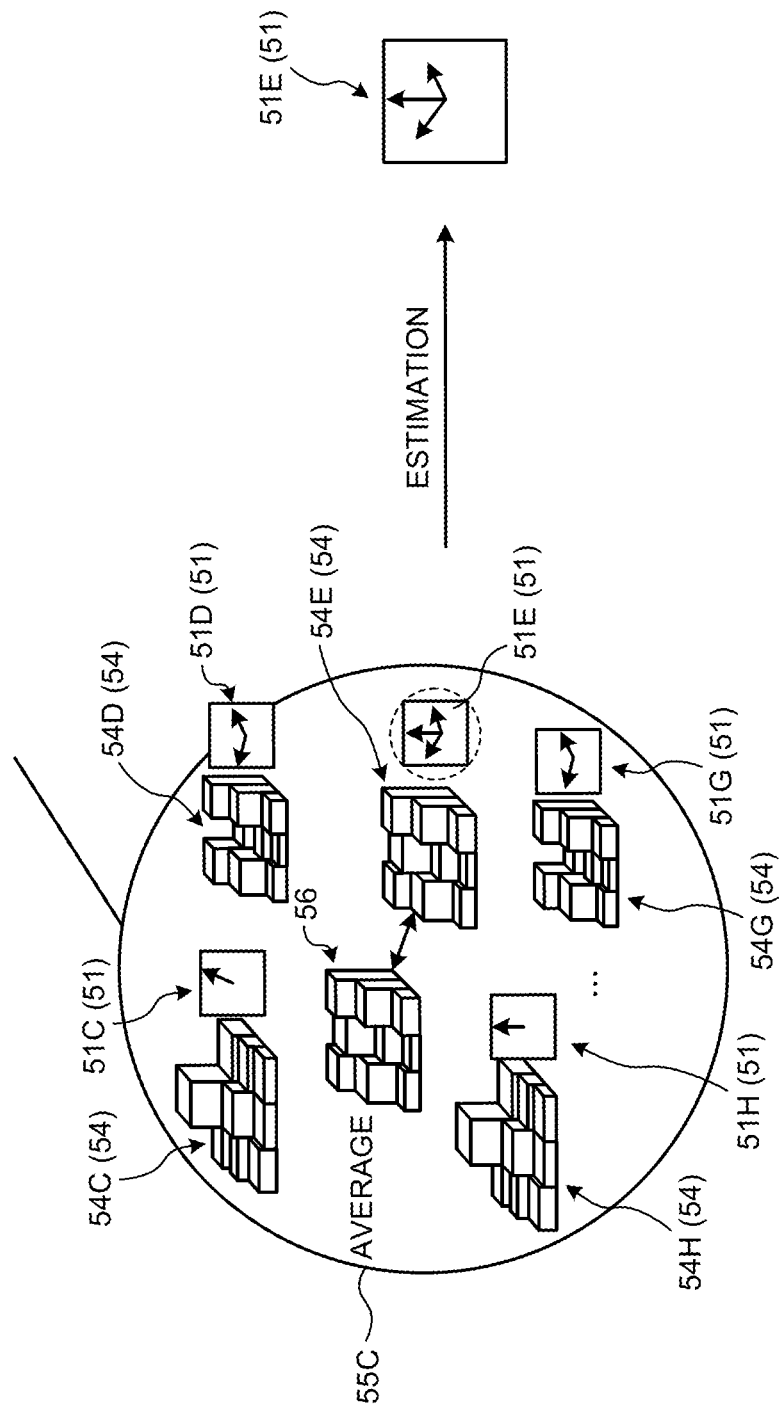
FIG. 16 is an explanatory diagram for explaining the estimation of representative labels.

FIG. 16 is an explanatory diagram for explaining the estimation of representative labels. With reference to FIG. 16, the explanation is given for an example of a single leaf node 55C. Firstly, the first estimator 43D reads the label 51 attached to each feature quantity v belonging to the leaf node 55C. In the example illustrated in FIG. 16, the first estimator 43D reads labels 51C, 51D, 51E, 51G, and 51H. Then, the first estimator 43D calculates an average histogram 56, which represents the average of the polling histograms 54 (54C, 54D, 54E, 54G, and 54H) corresponding to the labels 51C, 51D, 51E, 51G, and 51H.

Then, the first estimator 43D selects, from among the polling histograms 54 (54C, 54D, 54E, 54G, and 54H) belonging to the leaf node 55C, the polling histogram 54 that is close to the average histogram 56. Herein, it is desirable that the first estimator 43D selects, from among the polling histograms 54 (54C, 54D, 54E, 54G, and 54H) belonging to the leaf node 55C, the polling histogram 54 that is closest to the average histogram 56. In the example illustrated in FIG. 16, the first estimator 43D selects the polling histogram 54E that is closest to the average histogram 56. Then, the first estimator 43D estimates the label 51E, which is the label 51 corresponding to the polling histogram 54E, as the representative label of the leaf node 55C.

The first estimator 43D performs the same operation for all leaf nodes 55C in all random trees 55 learnt by the learning unit 43C, and thus estimates the representative label of each leaf node 55C.

Figure 17:
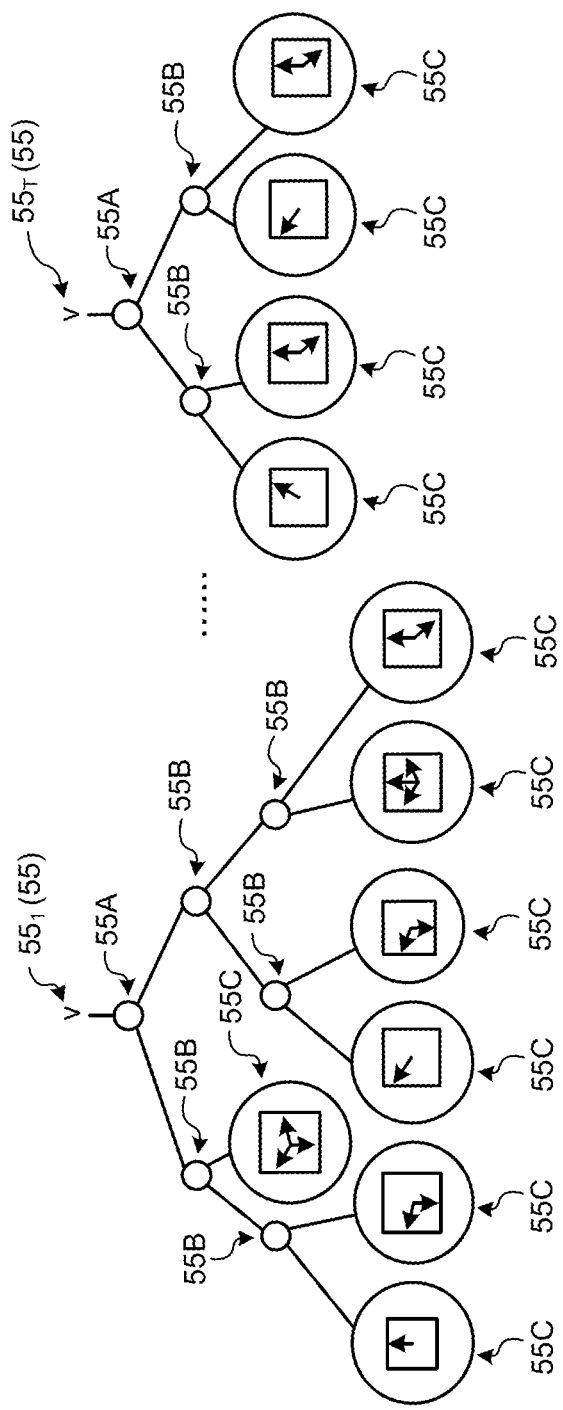
FIG. 17 is an explanatory diagram for explaining the random trees after the representative labels are estimated.

FIG. 17 is an explanatory diagram for explaining the random trees 55 after the representative labels are estimated.

As illustrated in FIG. 17, when the first estimator 43D estimates the representative label for each leaf node 55C, the representative labels get estimated for all leaf nodes 55C in all random trees 55 (the random trees $55_1$ to $55_T$) included in the random forest that is learnt by the learning unit 43C.

As a result of performing the operations described above, the arithmetic processor 43 calculates the regression models and the representative labels.

Returning to the explanation with reference to FIG. 8, the second estimator 44 obtains the random trees 55, which are calculated as regression models by the arithmetic processor 43, and the representative labels of the leaf nodes 55C. Then, the second estimator 44 substitutes the feature quantities, which are calculated from the partial images, in the parameters of the random trees 55 obtained by the arithmetic processor 43. With that, the second estimator 44 estimates the representative label corresponding to each partial image.

Herein, if the arithmetic processor 43 obtains only a single random tree 55, the second estimator 44 estimates a single representative label for each partial image using the single random tree 55. On the other hand, if the arithmetic processor 43 obtains a plurality of random trees 55 (i.e., obtains a random forest), then the second estimator 44 obtains, for each partial image, a plurality of representative labels corresponding to the random trees 55 and estimates one of those representative labels as the representative label to be used in density measurement.

Figure 18:
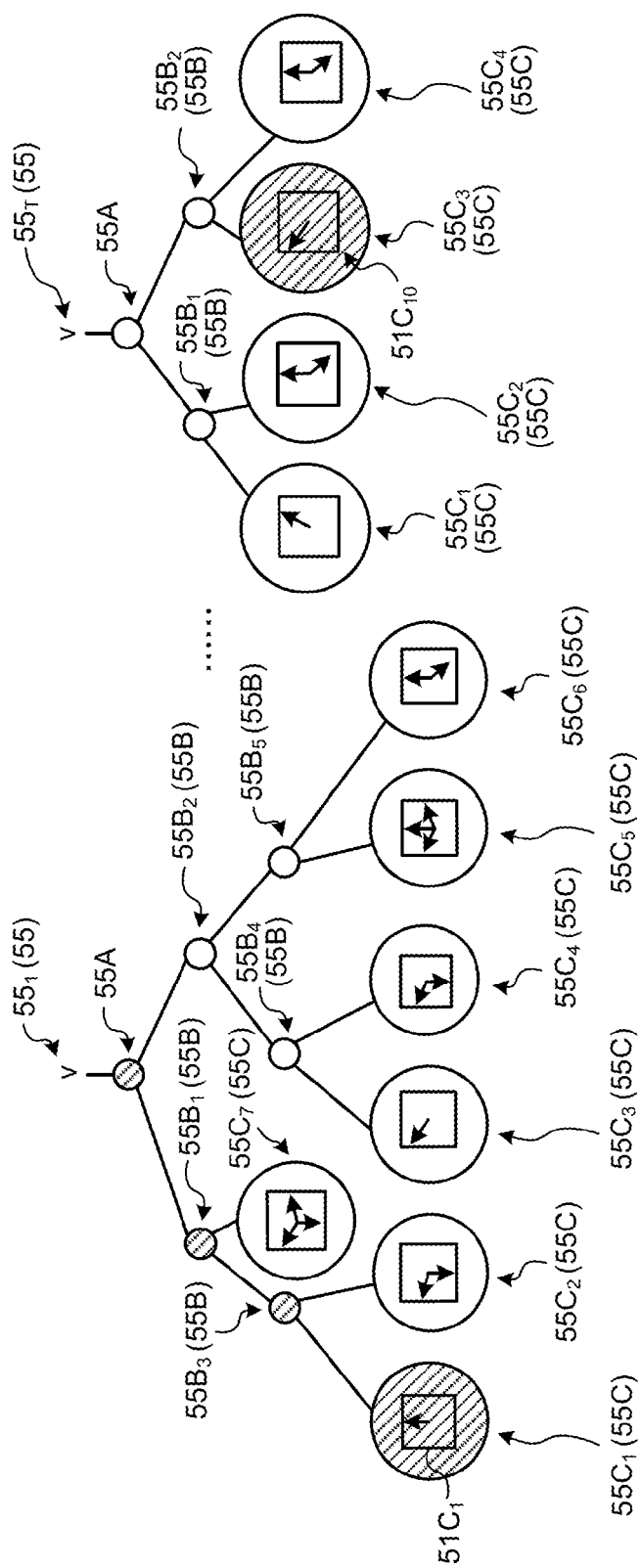
FIG. 18 is an explanatory diagram for explaining representative label estimation.

FIG. 18 is an explanatory diagram for explaining representative label estimation performed by the second estimator 44. Herein, it is assumed that the arithmetic processor 43 obtains the random trees 55 (the random trees $55_1$ to $55_T$) and the representative labels as illustrated in FIG. 18.

In that case, the second estimator 44 substitutes the feature quantity of a partial image in the root node 55A of each random tree 55 (each of the random trees $55_1$ to $55_T$). Then, along the division index determined for each node of each random tree 55 (each of the random trees $55_1$ to $55_T$), the second estimator 44 comes down the tree structure from the root node 55A to the leaf nodes 55C via the child nodes 55B. Then, the second estimator reads the representative labels belonging to the leaf nodes 55C.

As a result, the second estimator 44 obtains a plurality of representative labels for each random tree 55 (each of the random trees $55_1$ to $55_T$) as the representative labels corresponding to the feature quantity of a single partial image.

For example, assume that a feature quantity v1 of a particular partial image is substituted as the variable of the random tree $55_1$ in the root node 55A. Moreover, assume that a leaf node $55C_1$ from among leaf nodes $55C_1$ to $55C_7$ is reached via child nodes $55B_1$ and $55B_3$ from among child nodes $55B_1$ to $55B_5$. In that case, the feature quantity v1 has a label $51C_1$ as the representative label determined by the random tree $55_1$.

Furthermore, assume that the feature quantity v1 is substituted as the variable of the random tree $55_T$ in the root node 55A. Moreover, assume that the leaf node $55C_3$ from among the leaf nodes $55C_1$ to $55C_4$ is reached via the child node $55B_2$ from among the child nodes $55B_1$ and $55B_2$. In that case, the feature quantity v1 has a label $51C_{10}$ as the representative label determined by the random tree $55_T$.

Then, from among the representative labels obtained for each random tree 55 (each of the random trees $55_1$ to $55_T$), the second estimator 44 estimates the representative label to be used in density calculation. Herein, the second estimator 44 estimates the representative label to be used in density calculation in an identical manner to the first estimator 43D.

That is, the second estimator 44 calculates an average histogram of the polling histograms 54 corresponding to the representative labels obtained for each random tree 55 (each of the random trees 55$_1$ to 55$_T$). Then, from among the representative labels obtained for each random tree 55 (each of the random trees 55$_1$ to 55$_T$), the second estimator 44 estimates, as the representative label to be used in density measurement, the representative label corresponding to the polling histogram 54 that is closest to the average histogram.

Returning to the explanation with reference to FIG. 8, the density calculator 45 calculates the average density of the objects captured in the correction image 33. The density calculator 45 calculates the average density of the objects based on the relative positions of the objects indicated by the representative labels that correspond to each partial image and that are estimated by the second estimator 44.

The density calculator 45 includes a second computing unit 45A, a third computing unit 45B, and a fourth computing unit 45C.

The second computing unit 45A calculates, based on the relative positions of the objects indicated by the representative labels corresponding to each of a plurality of partial images, the density distribution of the objects in each partial image. The second computing unit 45A stores therein in advance the first positions used by the arithmetic processor 43. Meanwhile, herein, the representative labels imply the representative labels to be used in density measurement.

For example, the second computing unit 45A uses a probability density function N( ) of a normalization distribution and calculates a density distribution Di(x) of the objects captured in a partial image.

$$Di(x) = \Sigma N(x; lj, \sigma) \qquad \text{Equation (7)}$$

In Equation (7), x represents an arbitrary position in the partial image. Moreover, in Equation (7), lj represents the estimated relative position of the object. Furthermore, in Equation (7), σ represents dispersion.

The third computing unit 45B arranges, at the position corresponding to each of a plurality of partial images extracted from the correction image 33, the density distribution of the partial image. Herein, arranging the density distribution implies attaching the density distribution of each partial image, which is extracted from the correction image 33, at the position corresponding to the corresponding partial image.

Meanwhile, there are times when a plurality of partial images extracted from the correction image has at least some mutually overlapping portion. Hence, when the density distributions of the partial images, which are extracted from the correction image 33, are arranged in the correction image 33, there are times when the density distributions corresponding to the partial images have at least some mutually overlapping portion.

In that regard, according to the frequency of overlapping of the density distributions in the correction image 33, the fourth computing unit 45C calculates a first average value of the densities of the objects for each pixel constituting the correction image 33. Then, for each region P used by the controller 12, the fourth computing unit 45C calculates the average value of the densities of the class of target objects for density calculation. Subsequently, the fourth computing unit 45C calculates the calculated value as the density of the class of target objects for density calculation that are included in each region P of the image 30 and that are treated as targets by the first calculator 15. Meanwhile, if the regions P are equivalent to only single pixels, then the fourth computing unit 45C can calculate, as the density of the class of target objects for density calculation in each region P representing a pixel, the first average value calculated for each pixel.

Then, as described above, in the first calculator 15, each object class captured in the image 30 is subjected to the operations performed by the preprocessing unit 40, the extractor 41, the first computing unit 42, the arithmetic processor 43, the second estimator 44, and the density calculator 45 (i.e., subjected to the calculation operation).

As a result, the first calculator 15 calculates the density of each object class captured in the region P of the image 30.

Figure 19:
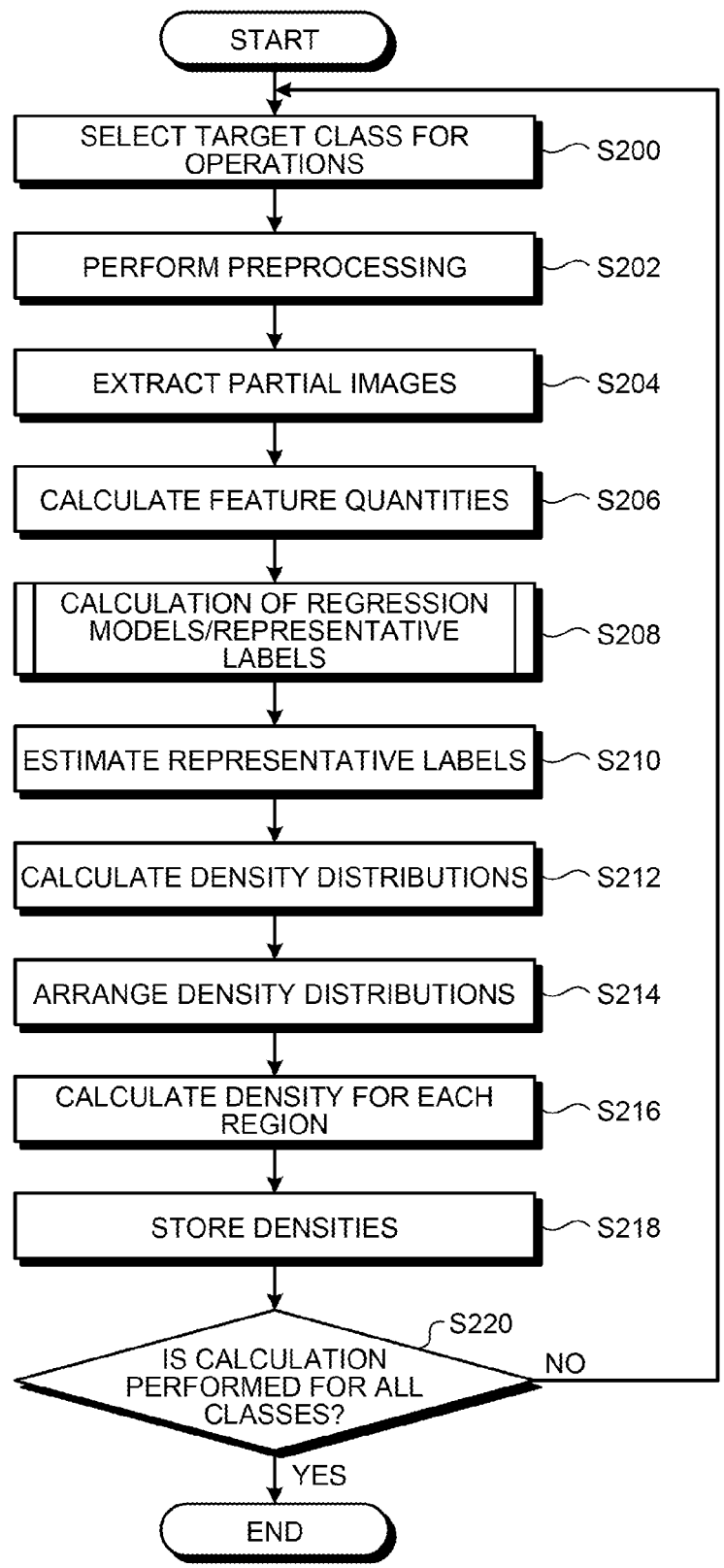
FIG. 19 is a flowchart for explaining a sequence of operations performed during a density calculation operation.

Given below is the explanation of a sequence of operations performed during the density calculation operation by the first calculator 15. FIG. 19 is a flowchart for explaining a sequence of operations performed during the density calculation operation by the first calculator 15.

Firstly, the first calculator 15 selects, from among the objects of a plurality of classes captured in the image 30, one object class that is not yet subjected to the density calculation operation (Step S200).

Then, the first calculator 15 performs the operations from Steps S202 to S218 with respect to the object class elected at Step S200.

More specifically, the preprocessing unit 40 sets the object class elected at Step S200 as the calculation target, and performs preprocessing with respect to the image 30 obtained by the obtainer 14 (see FIG. 1) (Step S202). That is, the preprocessing unit 40 performs a reduction operation for reducing the size of the object/objects of the class/classes other than the class of the target object/objects for calculation in the image 30 and a correction operation for correcting the color/colors of the object class/classes other than the class of the target object/objects for calculation, to be the background color, and generates the correction image 33.

Subsequently, the extractor 41 extracts a plurality of partial images from the correction image 33 generated at Step S202 (Step S204). Then, the first computing unit 42 calculates the feature quantity of each partial image (Step S206).

Then, the arithmetic processor 43 calculates the random trees 55 as regression models and calculates representative labels (Step S208) (details given later).

Subsequently, the second estimator 44 substitutes the feature quantities, which are calculated from the partial images, in the parameters of the random trees 55 obtained by the arithmetic processor 43. With that, the second estimator 44 estimates the representative label corresponding to each partial image (Step S210).

Then, the second computing unit 45A calculates, based on the relative positions of the objects indicated by the representative labels, the density distribution of the objects in each partial image (Step S212).

Subsequently, the third computing unit 45B arranges, at the position corresponding to each of a plurality of partial images extracted from the correction image 33, the density distribution of the corresponding partial image (Step S214). Then, according to the frequency of overlapping of the density distributions in the correction image 33, the fourth computing unit 45C calculates the densities of the object classes captured in each region P of the correction image 33 (Step S216).

Subsequently, the fourth computing unit 45C stores, in the memory 13, the densities of the object classes captured in each region P as calculated at Step S216 (Step S218).

Then, the first calculator 15 determines whether or not the density calculation has been performed with respect to all object classes captured in the image 30 that is obtained by the obtainer 14 (Step S220). That is, the determination at Step S220 is performed by determining whether or not the operations from Steps S200 to S218 are performed with respect to all object classes captured in the image 30 that is obtained by the obtainer 14.

If the operations are not performed with respect to all object classes (No at Step S220), the system control returns to Step S200. When the operations are performed with respect to all object classes (Yes at Step S220), it marks the end of the present routine.

Given below is the explanation of the arithmetic processing performed by the arithmetic processor 43 at Step S208 illustrated in FIG. 19. FIG. 20 is a flowchart for explaining a sequence of operations performed during the arithmetic processing by the arithmetic processor 43.

Firstly, the searcher 43A of the arithmetic processor 43 attaches a label to the feature quantity of each of a plurality of partial images 50 calculated at Step S206 (see FIG. 19) (Step S300). The polling unit 43B calculates the histogram 52 from the labels 51, and polls the histogram 52 in the parametric space 53 to generate the polling histogram 54 (Step S302).

Then, the learning unit 43C learns regression models that represent the relationship between the feature quantities of the partial images 50 and the relative positions of the objects captured in those partial images 50 (Step S304). In the second embodiment, as described above, the learning unit 43C learns the random trees 55 as the regression models.

Then, the first estimator 43D estimates a representative label for each cluster (each leaf node 55C) that is obtained by means of division by the learning unit 43C during the learning (Step S306).

Subsequently, in the arithmetic processor 43, the random trees 55 learnt as regression models and the representative labels of the clusters (the leaf nodes 55C) are output to the second estimator 44. It marks the end of the present routine.

As described above, in the second embodiment, the first generator 17 searches for the objects captured in each of a plurality of partial images 50 extracted from the image 30 (or the correction image 33). Then, the searcher 43A generates, as the label, a vector representing the relative positions between the predetermined first position in each partial image 50 and all objects captured in the partial image 50. The learning unit 43C learns the regression models by assigning the labeled feature quantity to each node and determines a division index of each node. The first estimator 43D estimates the representative label for each leaf node 55C of the regression models.

A label represents a vector indicating the relative positions of the objects, and has a small data size. For that reason, it becomes possible to reduce the volume of data required in configuring the regression models. Thus, as a result of performing density calculation using the regression models according to the second embodiment, the density measuring device 10 not only can achieve the effect of the first embodiment but also can achieve density calculation for objects using a low amount of memory.

Meanwhile, the first calculator 15 learns the regression models without directly detecting the objects from the correction image 33. Hence, in the density measuring device 10 according to the second embodiment, even if the objects captured in the correction image 33 are small and overlapping, the first calculator 15 can learn the regression models, which enable density calculation with high accuracy, without causing a decline in the measurement accuracy.

Hence, in the density measuring device 10 according to the second embodiment, as a result of performing the operations explained in the second embodiment, it is not only possible to achieve the effect achieved in the first embodiment, but it is also possible to provide data (regression models) for performing density calculation with high accuracy and low memory to the first calculator 15.

Modification Example

In the second embodiment, the explanation is given for a case in which a random forest is used as the regression models. However, the regression models learnt by the first calculator 15 are not limited to a random forest. Alternatively, for example, the first calculator 15 can use a nearest neighbor classifier as the regression model.

FIG. 21 is an explanatory diagram for explaining the learning using a nearest neighbor classifier. The learning unit 43C (see FIG. 11) learns the regression model by dividing the feature quantity v, which corresponds to each of a plurality of partial images 50 and which has the label 51 attached thereto, in a plurality of clusters 66 in such a way that there is a decrease in the variability in the corresponding polling histograms.

More particularly, the learning unit 43C divides the feature quantity v, which corresponds to each of a plurality of partial images 50 and which has the label 51 attached thereto, into k number of clusters 66 by implementing a vector quantization method such as k-means.

More specifically, the learning unit 43C randomly assigns the clusters 66 to arbitrary labels 51 and calculates the average value for each cluster 66. Then, the learning unit 43C obtains the distance between each label 51 and the average value for each cluster 66, and reassigns each label 51 to the cluster 66 having the closest average value. During these operations, if there is no change in the assignment of the labels to the clusters 66, it marks the end of the operations. Otherwise, the operations are repeatedly performed.

As a result, the feature quantities v having the labels 51 attached thereto are divided into the clusters 66 on the basis of groups of similar feature quantities v.

The first estimator 43D calculates the average value of the labels 51 that are attached to the feature quantities v belonging to each cluster 66. Then, from among the labels 51 attached to the feature quantities v belonging to each cluster 66, the first estimator 43D estimates the label 51 that is closest to the calculated average value as the representative label.

Moreover, the first calculator 15 obtains a nearest neighbor classifier as the regression model. In that case, the second estimator 44 uses the nearest neighbor classifier to match the feature quantity calculated from a partial image and the estimated representative vector of each cluster, and selects the representative vector having the shortest distance to the feature quantity calculated from the partial image. Then, from the set of labels 51 attached to the feature quantities belonging to the cluster to which the selected representative vector belongs, the second estimator 44 can estimate the representative label corresponding to each partial image in an identical manner to the first estimator 43D.

Figure 22:
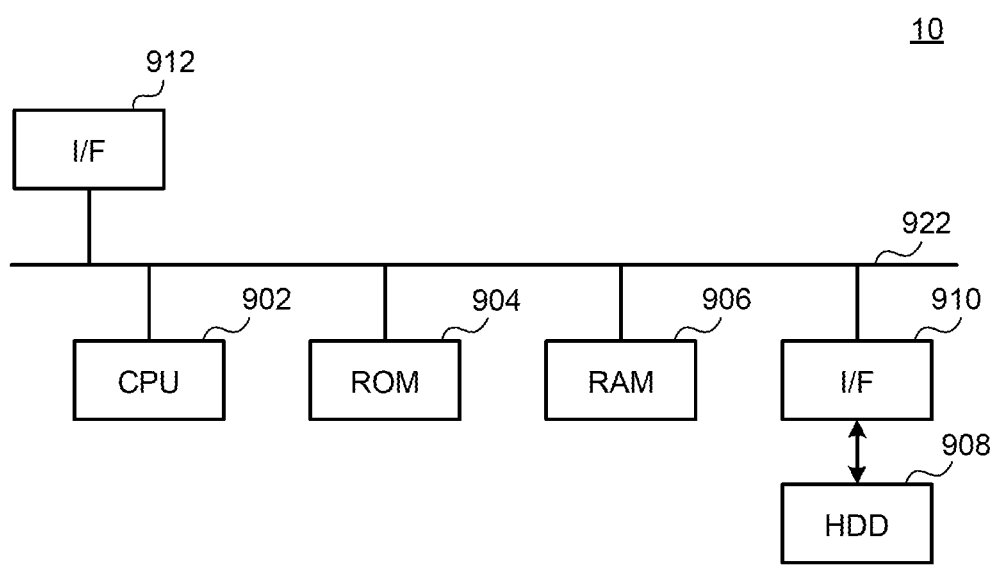
FIG. 22 is a block diagram illustrating an exemplary hardware configuration.

FIG. 22 is a block diagram illustrating an exemplary hardware configuration of the density measuring device 10 according to the embodiments and the modification example described above. As illustrated in FIG. 22, the density measuring device 10 according to the embodiments and the modification example described above has the hardware computer of a general-purpose computer that includes a central processing unit (CPU) 902, a random access memory (RAM) 906, a read only memory (ROM) 904 used for storing computer programs, a hard disk drive (HDD) 908, an interface (I/F) 910 serving as the interface with the HDD 908, an I/F 912 for image input-output purposes, and a bus 922. The CPU 902, the ROM 904, the RAM 906, the I/F 910, and the I/F 912 are connected to each other via the bus 922.

In the density measuring device 10 according to the embodiments and the modification example described above, the CPU 902 reads computer programs from the ROM 904 into the RAM 906, and executes them so that the constituent elements are implemented in the computer.

The computer programs that are executed to implement the operations performed in the density measuring device 10 according to the embodiments and the modification example described above can be stored in the HDD 908. Alternatively, the computer programs that are executed to implement the operations performed in the density measuring device 10 according to the embodiments and the modification example described above can be stored in advance in the ROM 904.

Still alternatively, the computer programs that are executed to implement the operations performed in the density measuring device 10 according to the embodiments and the modification example described above can be stored as installable or executable files in a computer-readable memory medium such as a compact disk read only memory (CD-ROM), a compact disk readable, a memory card, a digital versatile disk (DVD), and a flexible disk (FD). Still alternatively, the computer programs that are executed to implement the operations performed in the density measuring device 10 according to the embodiments and the modification example described above can be saved as downloadable files on a computer connected to the Internet or can be made available for distribution through a network such as the Internet.

For example, unless contrary to the nature thereof, the steps of the flowcharts according to the embodiments described above can have a different execution sequence, can be executed in plurality at the same time, or can be executed in a different sequence every time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A density measuring device comprising one or more processors programmed to:
    calculate, for each of a plurality of regions in an image including objects of a plurality of classes, a density corresponding to a number of objects of each object class captured in the region;
    calculate, from the density, a probability of each such object class captured for each of the regions; and
    generate density data, in which a position corresponding to each of the regions in the image is assigned with the density of an object class having the higher probability than the lowest probability of an object class in a corresponding region.

2. The device according to claim 1, wherein the one or more processors are further programmed to calculate the density of each such class in the image on the basis of the density data.

3. The device according to claim 1, wherein the one or more processors are further programmed to generate density data in which the position is assigned with the density of each such object class having the highest probability among the probabilities calculated for the object classes captured in the corresponding region.

4. The device according to claim 1, wherein the objects of the plurality of classes have at least different colors or different shapes.

5. The device according to claim 1, wherein the one or more processors are further programmed to generate, from the density data, a display image in which the position is illustrated with a color corresponding to the assigned object class and with concentration corresponding to the density for the position.

6. The device according to claim 1, wherein the one or more processors are further programmed to:
    perform a calculation operation, in which the density of the object class captured in each of the regions in the image is calculated, and
    perform, before performing the calculation operation for each such object class, preprocessing that includes a reduction operation, for reducing a size of an object or objects of an object class other than a target object class to be calculated in the image, and a correction operation, for correcting a color of the objects of the objet class other than the target object class to be calculated, to be a background color.

7. The device according to claim 1, wherein the processor calculates, as the probability each such object class captured in each of the regions, a multiplication value obtained by multiplying the calculated density of each such object class captured in the regions, by at least one of area ratio with respect to a reference object of the object class captured in the image and a degree of similarity to a reference color of the object class.

8. A density measuring method comprising:
    calculating, for each of a plurality of regions in an image including objects of a plurality of classes, a density corresponding to a number of objects of each object class captured in the region;
    calculating, from the density, a probability of each such object class captured for each of the regions; and
    generating density data, in which a position corresponding to each of the regions in the image is assigned with the density of an object class having the higher probability than the lowest probability of an object class in a corresponding region.

9. The method according to claim 8, further comprising calculating the density of each such class in the image on the basis of the density data.

10. The method according to claim 8, further comprising generating density data in which the position is assigned with the density of each such object class having the highest probability among the probabilities calculated for the object classes captured in the corresponding region.

11. The method according to claim 8, wherein the objects of the plurality of classes have at least different colors or different shapes.

12. The method according to claim 8, further comprising generating, from the density data, a display image in which the position is illustrated with a color corresponding to the assigned object class and with concentration corresponding to the density for the position.

13. The method according to claim 8, further comprising:
performing a calculation operation, in which the density of the object class captured in each of the regions in the image is calculated, and
performing, before performing the calculation operation for each such object class, preprocessing that includes a reduction operation, for reducing a size of an object or objects of an object class other than a target object class to be calculated in the image, and a correction operation, for correcting a color of the objects of the objet class other than the target object class to be calculated, to be a background color.

14. A computer program product comprising a non-transitory computer readable medium including programmed instructions embodied therein, wherein the instructions, when executed by a computer, cause the computer to perform:
calculating, for each of a plurality of regions in an image including objects of a plurality of classes, a density corresponding to a number of objects of each object class captured in the region;
calculating, from the density, a probability of each such object class captured for each of the regions; and
generating density data, in which a position corresponding to each of the regions in the image is assigned with the density of an object class having the higher probability than the lowest probability of an object class in a corresponding region.

15. The computer program product according to claim 14, wherein the instructions, when executed by a computer, further cause the computer to calculate the density of each such class in the image on the basis of the density data.

16. The computer program product according to claim 14, wherein the instructions, when executed by a computer, further cause the computer to generate density data in which the position is assigned with the density of each such object class having the highest probability among the probabilities calculated for the object classes captured in the corresponding region.

17. The computer program product according to claim 14, wherein the objects of the plurality of classes have at least different colors or different shapes.

18. The computer program product according to claim 14, wherein the instructions, when executed by a computer, further cause the computer to generate, from the density data, a display image in which the position is illustrated with a color corresponding to the assigned object class and with concentration corresponding to the density for the position.

19. The computer program product according to claim 14, wherein the instructions, when executed by a computer, further cause the computer to:
perform a calculation operation, in which the density of the object class captured in each of the regions in the image is calculated, and
perform, before performing the calculation operation for each such object class, preprocessing that includes a reduction operation, for reducing a size of an object or objects of an object class other than a target object class to be calculated in the image, and a correction operation, for correcting a color of the objects of the objet class other than the target object class to be calculated, to be a background color.

* * * * *